United States Patent
Agrawal et al.

(10) Patent No.: US 11,804,225 B1
(45) Date of Patent: Oct. 31, 2023

(54) DIALOG MANAGEMENT SYSTEM

(71) Applicant: Amazon Technologies, Inc., Seattle, WA (US)

(72) Inventors: Ashish Kumar Agrawal, Mountain View, CA (US); Kemal Oral Cansizlar, Seattle, WA (US); Suranjit Adhikari, San Jose, CA (US); Shucheng Zhu, San Jose, CA (US); Raefer Christopher Gabriel, San Jose, CA (US); Arindam Mandal, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 211 days.

(21) Appl. No.: 17/375,458

(22) Filed: Jul. 14, 2021

(51) Int. Cl.
*G10L 15/22* (2006.01)
*G10L 15/18* (2013.01)
*G10L 15/30* (2013.01)

(52) U.S. Cl.
CPC .......... *G10L 15/22* (2013.01); *G10L 15/1815* (2013.01); *G10L 15/30* (2013.01); *G10L 2015/223* (2013.01)

(58) Field of Classification Search
CPC ..... G10L 15/22; G10L 15/1815; G10L 15/30; G10L 2015/223
See application file for complete search history.

(56) References Cited

U.S. PATENT DOCUMENTS

| | | | | |
|---|---|---|---|---|
| 5,784,562 | A * | 7/1998 | Diener | H04L 9/40 709/227 |
| 10,079,013 | B2 * | 9/2018 | Kalns | G10L 15/1822 |
| 10,909,982 | B2 * | 2/2021 | Kwon | G06F 3/167 |
| 2014/0310001 | A1 * | 10/2014 | Kalns | G10L 15/30 704/270.1 |

* cited by examiner

*Primary Examiner* — Abul K Azad
(74) *Attorney, Agent, or Firm* — PIERCE ATWOOD LLP

(57) ABSTRACT

Techniques for conversation recovery in a dialog management system are described. A system may determine, using dialog models, that a predicted action to be performed by a skill component is likely to result in an undesired response or that the skill component is unable to respond to a user input of a dialog session. Rather than informing the user that the skill component is unable to respond, the system may send data to the skill component to enable the skill component to determine a correct action responsive to the user input. The data may include an indication of the predicted action and/or entity data corresponding to the user input. The system may receive, from the skill component, response data corresponding to the user input, and may use the response data to update a dialog context for the dialog session and an inference engine of the dialog management system.

20 Claims, 10 Drawing Sheets

DIALOG MANAGEMENT SYSTEM

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
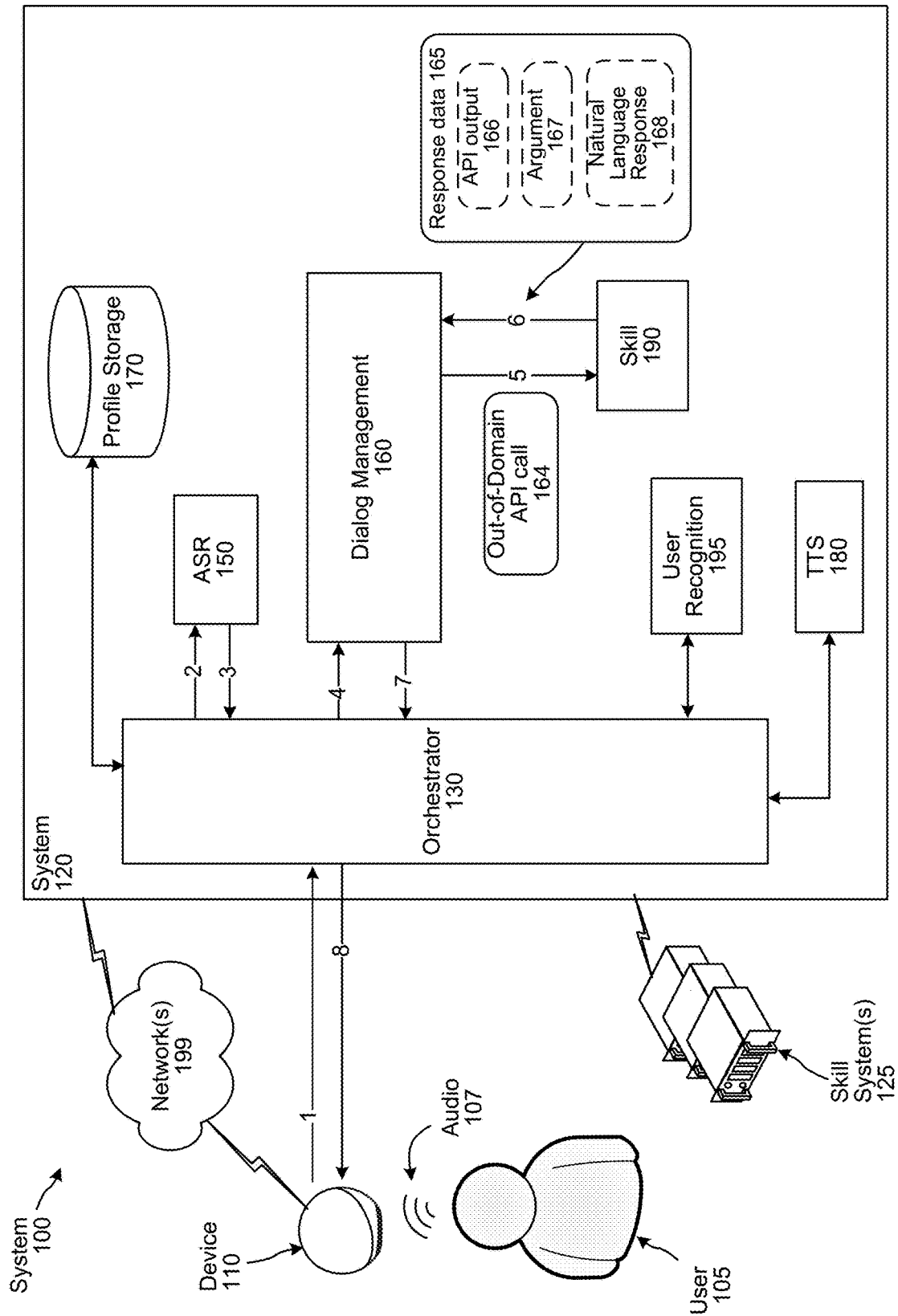
FIG. 1 is a conceptual diagram illustrating an example system for dialog recovery by a skill component, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Dialog processing, as used herein, is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems often need to recognize, retain, and use information collected during more than one input during a back-and-forth or "multi-turn" interaction with the user.

The system may be configured to respond to the user across multiple exchanges between the user and the system. For example, the user may say to the system "play me some music" and the system may respond "what are you in the mood for?" The user may respond "something relaxing" and the system may respond "how about smooth jazz?" Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system.

A dialog may be goal-oriented, meaning the dialog is directed to the system performing a specific action requested by a user (such as figuring out what music the system should play in response to a user input to play music). Alternatively, a dialog may be conversational, for example as part of a freeform conversation between the system and a user that may not have a definite end point or know the final action desired from the system in mind at the beginning of the conversation. System components that control what actions the system takes in response to various user inputs of a dialog may sometimes be referred to as chatbots.

A user input and performance by the system of a corresponding action, responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the dialog session identifier or other data to track the progress of the dialog to select system responses in a way that tracks the previous user-system exchanges, thus moving the dialog along in a manner that results in a desirable user experience.

In certain goal-oriented dialog systems, a developer may provide a number of actions (which may be application programming interfaces (APIs)) that a skill component can perform in response to a user input of a dialog and certain context information from the prior turns of the dialog, and the system learns to predict an action (from those provided by the developer) to be performed in response to a user input. Such systems may predict an incorrect action (e.g., predict the action with a low confidence score) or may predict that an action responsive to the user input is out-of-domain for the skill component. As used herein, an out-of-domain action refers to an action that the particular skill component is unable to perform, at least based on the actions provided by the developer. In other words, in determining an out-of-domain action, the system may determine that the particular skill component is not capable of responding to the user input.

Generating a system response based on the incorrectly predicted action or the out-of-domain action results in the system providing an undesired response to the user. For example, the system may perform the incorrectly predicted action, and may output a response that is not responsive to the user input (e.g., the system may play a song when the user requested a movie). As a further example, the system may inform the user that it is unable to process the user input (e.g., the system may output the following synthesized speech "Sorry, I don't understand your request" or "Sorry, I cannot respond"). Such undesired responses can negatively affect a user's experience.

The present disclosure relates to techniques for reducing undesired responses generated during dialog sessions. When a system of the present disclosure determines that a predicted action is likely to result in an undesired response or that a skill component is not capable of responding to a user input, the system enables the skill component to determine a correct action to be performed in response to the user input. The system, in such cases, sends the skill component input data (e.g., audio data corresponding to a spoken input, ASR data corresponding to a spoken input, etc.) corresponding to the user input to enable the skill component to determine the correct action. Thus, the techniques of the present disclosure enable skill components to recover a user's experience during dialog sessions that may have otherwise been a poor experience (due to outputting of an undesired response).

In some embodiments, the skill component, after determining the correct action, provides information to enable the system to learn to predict the correct action for future user inputs. The skill component can provide an indication of the correct action (e.g., the correct API), data used to perform the correct action, and/or the correct system response for the user input.

The system also updates the context information for the dialog session to include the correct action and/or the correct system response, so that subsequent turns of the dialog session result in output of desired responses.

As used herein, a "skill" may refer to software, that may be placed on a machine or a virtual machine (e.g., software that may be launched in a virtual instance when called), configured to perform one or more actions that are responsive to a user input. What is referred to herein as a skill may sometimes be referred to as an application, bot, action, or the like.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 is a conceptual diagram illustrating an example system for dialog recovery by a skill component, in accordance with example embodiments. As shown in FIG. 1, the system 100 may include a device 110, local to a user 105, connected to a system 120 across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may be a speech-based dialog management system configured to process spoken natural language inputs using ASR processing. The system 120 may include multiple components to facilitate speech processing, such as, an orchestrator component 130, an ASR component 150, a dialog management component 160, and one or more skill components 190. One or more of the skill components 190 may be in communication with a skill system(s) 125, which may be external to the system 120. The system 120 may also include a profile storage 170, a TTS component 180, and a user recognition component 195 to facilitate processing of users inputs and generating outputs.

The dialog management component 160 may have received one or more prior user inputs for a dialog session associated with a dialog session identifier. Based on processing the prior user inputs, the dialog management component 160 may have determined that the skill component 190 corresponds to the current dialog session (e.g., the skill component 190 was invoked to respond to at least one of the prior user inputs). The skill component 190 may be in focus (e.g., the skill component 190 was invoked to respond the most recent user input of the current dialog session, another component of the system 120 determined that the skill component 190 is to be invoked for the current dialog session, etc.).

Referring to FIG. 1, the user 105 may speak an input, and the device 110 may capture audio 107 representing the spoken user input. For example, the user 105 may say "Alexa, I want to watch a movie" or "Alexa, what movies are currently playing in theatres." In other examples, the user 105 may provide another type of input (e.g., selection of a button, selection of displayed graphical interface elements, may perform a gesture, etc.). The device 110 may send (step 1) audio data (or other type of input data, such as, image data, text data, etc.) corresponding to the user input to the system 120 for processing.

The orchestrator component 130 may receive the input data from the device 110. In the case that the input data is audio data, the orchestrator component 130 may send (step 2) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component may send (step 3) the ASR data to the orchestrator component 130. The dialog management component 160 may store the ASR data (e.g., a dialog focus component 216 may store the ASR data) as dialog context data for the dialog session.

Figure 2:
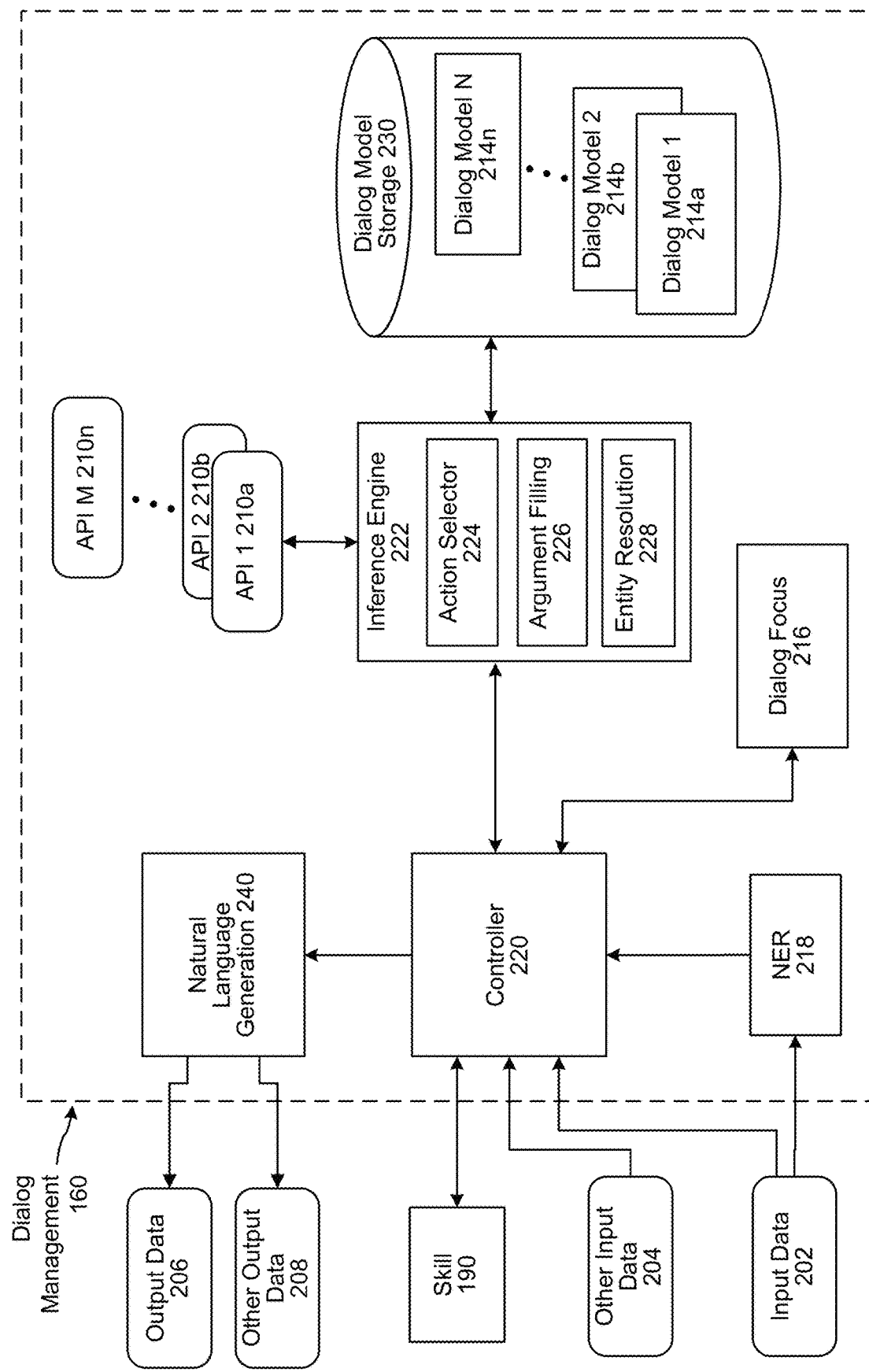
FIG. 2 is a conceptual diagram illustrating an example dialog management component, according to embodiments of the present disclosure.

The orchestrator component 130 may send (step 4) the ASR data to the dialog management component 160. In the case the input data is other than audio data, the orchestrator component 130 may send the input data to the dialog management component 160 or another component (not shown) for processing. The dialog management component 160 may associate the ASR data (or other input data) with the dialog session identifier for the current dialog session. The dialog management component 160 may include at least a Named Entity Recognition (NER) component 218 (shown in FIG. 2) and an inference engine 222 (shown in FIG. 2). The dialog management component 160 may include more components shown in FIG. 2 and described below in detail. The NER component 218 may process the ASR data to determine one or more entities corresponding to the user input. The NER component 218 may determine and output entity data, which may include portions of the user input tagged as corresponding to an entity, and may also include an entity type. For example, for the user input "play [song name] by [artist]," the NER component 218 may determine the following entity data: {<Verb>: "Play"; <SongName>: "[song name]"; <Artist>: "[artist]"}. The NER component 218 may send the entity data to the inference engine 222 for processing. In some embodiments, as shown in FIG. 2, the NER component 218 may send the entity data to another component of the dialog management component 160 (e.g., a controller 220), and the other component may send the entity data to the inference engine 222.

The inference engine 222 may process the entity data (and in some embodiments, the ASR data) to determine an action to be performed in response to the user input. Details on how the inference engine 222 determines the action are described below in relation to FIG. 2.

Based on processing the entity data (and the input data), the inference engine 222 may determine that the skill component 190 (currently in focus) is unable to respond to the user input or that an action associated with the skill component 190 is likely to result in an undesired response to the user input. Details on how the inference engine 222 makes this determination are described below in relation to FIGS. 3 and 4. As opposed to outputting an error, based on foregoing determination, the inference engine 222 may send (step 5), to the skill component 190, a command to execute an out-of-domain API 164. The out-of-domain API 164 of the skill component 190 may be configured to execute a process (software code) that enables the skill component 190 to determine an action responsive to the user input based at least on the entity data received from the dialog management component 160. In some embodiments, the command may be sent to the skill component 190 via the controller 220 as shown in FIG. 2. The dialog management component 160 may also send, to the skill component 190, along with the command the entity data determined by the NER component 218 and corresponding to the user input. The entity data may be sent as arguments for the out-of-domain API call. In some embodiments, the dialog management component 160 may also send the ASR data corresponding to the user input.

In response to the command to execute the out-of-domain API 164, the skill component 190 may process the entity data, and other data received from the dialog management component 160 to determine an action to be performed in response to the user input. The action, for example, may be executing another API, generating a natural language response, or both. The skill component 190 may perform the action and determine response data 165 corresponding to the user input. The skill component 190 may send (step 6) the response data 165 to the dialog management component 160. The response data, for example, may be an output 166 of the other API, the natural language response 168, or both. In some embodiments, the skill component 190 may also send, to the dialog management component 160, argument data 167 (e.g., one or more entities used to execute the other API, one or more entities used to generate the natural language response) used to perform the action. The dialog management component 160 may store the response data 165 (and the argument data 167) to update the dialog context for the current dialog session. The foregoing stored data may be used by the dialog management component 160 to determine actions for subsequent user inputs of the current dialog session. The foregoing stored data may also be used by the dialog management component 160 to update (e.g., retrain) the inference engine 222 and/or other components of the dialog management component 160 so that it can predict a correct action for similar user inputs in the future.

The dialog management component 160 may send (step 7), to the orchestrator component 130, output data, which may be based on the response data received from the skill component 190. In some cases the output data may be the response data. In other cases, the dialog management component 160 may use some natural language generation techniques (e.g., using a natural language generation component 240 shown in FIG. 2) to determine the output data based on the response data. In some cases, where the response data is an output of an API call, the dialog management component 160 may determine the output data to be a natural language output informing the user 105 of performance of an action associated with the API.

The orchestrator component 130 may send (step 8) the output data to the device 110 for output to the user 105 in response to the user input received at step 1. In some cases, the orchestrator component 130 may send the output data from the dialog management component 160 to the TTS component 180 to generate output audio data representing synthesized speech and corresponding to the output data received from the dialog management component 160. The orchestrator component 130, at step 8, may send the output audio data to the device 110 for output. In other cases, the output data may be text data, image data or other graphical data, and the device 110 may display such data for the user 105. In other cases, the output data may be a combination of output audio data representing synthesized speech and displayable data.

FIG. 2 is a conceptual diagram illustrating example components of the dialog management component 160, according to embodiments of the present disclosure. The dialog management component, in addition to the NER component 218 and the inference engine 222, may also include a controller component 220, a dialog focus component 216, and a natural language generation (NLG) component 240.

The dialog management component 160 receives input data 202. The input data 202 may include text data, token data, or ASR output data (one or more ASR hypotheses, each including text data or token data, and a corresponding confidence score) corresponding to a user input provided by the user 105. The input data 202 may be data representing words, instructions, markup language, speech, or gestures, or may be a vector or other representation of the same. The input data 202 may be generated by a user via a keyboard, touchscreen, microphone, camera, or other such input device associated with the device 110. In other embodiments, the input data 202 is generated by the ASR component 150, as described herein, from audio data corresponding to a spoken input received from the user 105.

The dialog management component 160 may receive other input data 204, which includes data indicating further information about the user input, such as the profile identifier for the user 105, an emotional state of the user, device information (e.g., device type, device identifier, device location, device capabilities, etc.) for the device 110, etc.

As described in greater detail below, using the input data 202 and/or other input data 204, the dialog management component 160 may determine output data 206 and/or other output data 208. The dialog management component 160 may instead or additionally perform an action based on the input data 202 and/or other input data 204, for example, by calling one or more APIs 210.

The NER component 218 may perform NER processing to identify words in the input data 202, which may be ASR output data or text data, as subject, object, verb, preposition, etc. based on grammar rules and/or machine learning models. The NER processing may then involve searching corresponding fields in a lexicon, attempting to match words and phrases in the input data 202, that NER processing tagged as a grammatical object or object modifier, with those identified in the lexicon.

NER processing may include semantic tagging, which is the labeling of a word or combination of words according to their type/semantic meaning. NER processing may include parsing the input data 202 using heuristic grammar rules, or a model that may be constructed using techniques such as hidden Markov models, maximum entropy models, log linear models, conditional random fields (CRFs), and the like. For example, NER processing of a user input "play [song name] by the [artist]" may determine {Verb}: "Play," {Object}: "[song name]," {Object Preposition}: "by," and {Object Modifier}: "the [artist]."

In some embodiments, the NER component 218 may identify the words in the input data 202 based on a skill component 190 that is in focus for the dialog session. For example, the NER component 218 may identify "Play" as a verb based on a word database associated with a music skill component, when the music skill component is the skill component that most recently processed with respect to the dialog session.

An output of the NER component 218 may be entity data including one or more words from the input data 202, each word tagged with an entity type (e.g., verb, object, subject, etc.).

The NER component 218 may include a ranker component. The ranker component may assign a particular confidence score to each entity data outputted. The confidence score of the entity data may represent a confidence of the NER component 218 in the processing performed with respect to the input data 202. The confidence score of a particular entity data may be affected by whether there are unfilled slots (unidentified words from the input data 202).

The controller component 220 may be configured to manage requests and data for the dialog management component 160. The controller component 220 may receive the other input data 204, and may send the other input data 204 to the dialog focus component 216, the inference engine 222, and/or the NLG component 240 for processing.

In some embodiments, a single NER component 218 may be used for multiple different groups of skills (e.g., different domains of skills) (i.e., a "cross-domain" NER component 218). As used herein, a "domain" may be a group of skills that perform similar or related functionalities. For example, a music domain may be associated with a first music skill, a second music skill, etc. In other embodiments, a different NER component 218 may be used for each different group of skills (different domains). One or more candidate skills corresponding to the input data 202 may be determined and NER components 218 corresponding to the candidate skills may be used to process the input data 202. A dialog focus component 216 may store the output entities from each candidate skill NER component and may remove unselected entities when a dialog model 214 is selected.

The controller component 220 may send the entity data from the NER component 218 to the dialog focus component 216.

The dialog focus component 216 that may store context data relating to a dialog session that can be used to determine a system response to a user input. The dialog focus component 216 may store dialog state data corresponding to dialog history data, action history data, and/or other data. The dialog history data may correspond to one or more user inputs provided by the user 105 during the current dialog session, and one or more system responses generated in response to the user inputs. The dialog history data may be text data, token data, or ASR data for the user inputs, and may be text data or other natural language data for the system responses. The action history data may correspond to one or more actions (as determined by the action selector 224) performed in response to the user inputs for the current dialog session. The action history data may include an identifier for the API 210 called to perform the action, the data inputted to the API 210, and the data outputted by the API 210. The dialog state data may be stored for each turn of the dialog session and may be identified by a turn number, so that the order in which the user inputs are received and the system responses are generated is known. The dialog state data may also include a skill identifier for the skill component 190 that may be invoked to generate the system response.

The dialog focus component 216 may store graph-based dialog state data including a plurality of graph nodes; each graph node may correspond to an item of state data, such as an entity type, entity value, prior API call, and/or user data. The other components, such as the inference engine 222, may access all of the graph nodes or may access only a subset of the graph nodes. The dialog focus component 216 may use any type of storage mechanism and may serve as long-term and/or short term memory for the dialog management component 160, thus enabling tracking of entities, ASR output data, TTS output data, and other features at each turn of a dialog. In some embodiments, the dialog focus component 216 may be updated after each turn of dialog with updated dialog state data.

The dialog focus component 216 may store data relevant to a dialog session. In various embodiments, the dialog focus component 216 stores the input data 202, other input data 204, entity data from the NER component 218, action data, and/or response data. The dialog focus component 216 may further store additional information, such as location data (e.g., user location and/or device location) user preference data, and environment data (e.g., information about where the device is located (in a vehicle, in an office, etc.)). In various embodiments, the dialog focus component 216 uses an encoder to encode some or all of the received data into one or more feature vectors and a decoder to determine, based on the feature vectors, goal data corresponding to a dialog goal of a user.

The controller component 220 may send data from the dialog focus component 216, the entity data from the NER component 218, the input data 202, and/or the other input data 204 to the inference engine 222 for processing. The inference engine 222, in some embodiments, may include an action selector component 224, which is configured to predict an action responsive to a user input, and an argument filling component 226, which is configured to determine data usable to perform the predicted action. In other embodiments, the inference engine 222 may include a single component for predicting the action and for determining the data needed to perform the predicted action.

The action selector component 224 processes the current dialog context and predicts the next action type and action name to run. The three action types, that action selector component 224 may predict from in some embodiments, are as follows: (1) API— which causes invocation of an API associated with the skill component; (2) Response—which causes output of a natural language response to the user (for example, inform of a transaction result or request more information), and (3) System—which causes the dialog management component 160 to wait for the next user input. This action type is an internal/system action to indicate all tasks have run.

The action name can be an API definition name or a response name. The inference engine 222 may run the action selector component 224 multiple times in a single turn until it predicts the System action type.

For example, a skill component may be configured to book movie tickets and may be associated with an API name "FindShowtimes", which has an argument, <title>, of type <MovieTitle>. The user 105 may say "Find showtimes for the [movie]." In this example, the action selector component 224 may run three times with respect to the user input. The first run may predict the API action type with name "FindShowtimes" and may invoke the API. The second run may predict the Response action type with name "InformMovieShowtimes" and may render the corresponding response. The third run may predict the System action type, which terminates action prediction processing by the action selector component 224.

In some embodiments, the action selector component 224 may process (at least) the input data 202 and the data from the dialog focus component 216 using one or more dialog models 214 stored at a dialog model storage 230. The action selector component 224 may select one or more dialog models 214, from the dialog model storage 230, for further processing of the input data 202. Each dialog model 214 may be associated with one or more categories of functions. Each dialog model 214 may correspond to a sample dialog flow including sample user inputs and sample system responses to the user inputs. The sample system responses may be natural language outputs, API calls, or both.

The action selector component 224 may be a trained model, such as a classifier. In some embodiments, the action selector component 224 generates an N-best list of dialog models including two or more of the dialog models 214 for further processing. The action selector component 224 may create the N-best list by determining a score for each dialog model 214 given the data stored at the dialog focus component 216 and the input data 202. The dialog model 214 may include a corresponding goal type (e.g., play music, reserve a taxi, book a flight, etc.), one or more corresponding APIs, one or more corresponding system responses, and/or one or more entities corresponding to the goal type. The action selector component 224 may, for example, determine a score, for a dialog model 214, based on a presence or absence of one or more entities determined by the NER component 218 in the dialog model 214. Presence of an entity in a list of entities corresponding to a dialog model 214 may, for example, result in a higher score for the dialog model 214. The action selector component 224 may send the input data 202 to the dialog models 214 having the N-highest scores. In other embodiments, the action selector component 224 sends the input data 202 to the dialog models 214 having scores greater than a threshold. The threshold may be a numerical value or the number N of dialog models 214 to be selected.

In some embodiments, the action selector component 224 may select the dialog model 214 with the highest score for further processing. The action selector component 224 may process the input data 202 and the data from the dialog focus component 216 using the selected dialog model 214. Such processing may result in determining an action to be performed in response to the user input corresponding to the input data 202. The action may be calling one or more APIs 210. For example, an API 210 configured to reserve a taxi may be called. The action may be outputting a natural language output, for example, to confirm performance of the action, to solicit additional data needed to perform the action, etc.

The argument filling component 226 may be configured to determine one or more types of data needed to perform the action determined by the action selector component 224. For example, the argument filling component 226 may determine which arguments are needed to call an API 210 (e.g., pick-up location, drop-off location, pick-up time, etc.), corresponding to the determined action. The argument filling component 226 may also determine whether the types of data needed are available at/known to the dialog management component 160. To make this determination, the argument filling component 226 may use the entity data generated by the NER component 218 and the data from the dialog focus component 216. For example, the user 105 may have mentioned one or more of the pick-up location, the drop-off location or the time in the instant user input (corresponding to the input data 202) or in the previous user inputs of the dialog session.

The argument filling component 226 fills action arguments with entities from the dialog context. An entity may be a slot the user mentioned in a user input or may be return values from previous invoked APIs in the dialog session.

When the action selector component 224 predicts an API action or a Response action, the next step is to determine how to fill the arguments with entities. The argument filling component 226 may use dialog context, stored at the dialog focus component 216, to access all available entities for the dialog session. The argument filling component 226 supports contextual carryover as it considers entities mentioned by the user 105 and entities outputted by APIs across the entire dialog session. The argument filling component 226 then selects the most likely entities to fill arguments (of the same type as the entities), which the inference engine 222 then uses when invoking actions.

For example, a skill component may be associated with an API definition "FindShowtimes", which has an argument, <title>, of type <MovieTitle>, and returns entity type <ShowTimeInfo>, which has properties <time>(entity type <Time>) and <theaterName>(entity type <TheaterName>). The user 105 may say "Find showtimes for the [movie]".

The NER component 218, in this example, may output entity data: {<MovieTitle>: "[movie]"}. The entity data may be stored in the dialog focus component 216. After the action selector component 224 predicts the API action with name "FindShowTimes", the argument filling component 226 may use {<MovieTitle>: "[movie]"} to fill the <title>argument of the "FindShowTimes" API, and the inference engine 222 then invokes the API. On the next run, the action selector component 224 may predict the Response action type with name "InformMovieShowtimes" associated with a <time>argument and a <theaterName>argument, and the argument filling component 226 may fill the arguments using the <time>entity and the <theaterName>entity returned by the "FindShowTimes" API.

In some embodiments, the argument filling component 226 may determine that one or more types of data needed to call an API 210 are not available/known to the dialog management component 160. In such cases, the inference engine 222 may determine to generate a natural language output requesting the missing data from the user 105.

In some embodiments, the argument filling component 226 may determine a confidence score for the data corresponding to a type of data needed to call an API 210. If the confidence score for the data is below a threshold value (i.e. the argument filling component 226 is not confident that the data corresponds to the type of data), then the inference engine 222 may generate a natural language output confirming use of the data to perform the action. For example, the system may output synthesized speech "Do you want a taxi to pick you up from [location]," where [location] may be derived from the entity data corresponding to the input data 202 or from the data stored at the dialog focus component 216.

If the argument filling component 226 determines that two pieces of data may correspond to the type of data (e.g., based on similar or same confidence scores), then the inference engine 222 may generate a natural language output requesting the user 105 to select one of the two pieces of data. For example, the system may output synthesized speech "Do you want a taxi to pick you up from [first location] or [second location]," where [first location] may be derived from the entity data corresponding to the input data 202 and [second location] may be derived from the data stored at the dialog focus component 216.

In generating a natural language output, the inference engine 222 may send natural language output data to the controller 220. The natural language output data may be text data, structured data, or other natural language representation data. The natural language output data may be provided to the NLG component 240, by the controller 220, for processing.

In some embodiments, the inference engine 222 may perform entity resolution after argument filling is complete by the argument filling component 226. An entity resolution component 228, of the inference engine 222, may be configured to perform entity resolution.

In some embodiments, the entity resolution component 228 may perform entity resolution processing to identify the specific entities included in the input data 202. For example, entity resolution processing may result in associating a word in the input data 202 to a particular person, place, thing, idea, and/or goal; example entities include proper names, nicknames, business names, place names, song titles, and skill names.

In some embodiments, the entity resolution component 228 may perform entity resolution processing if the action selector component 224 predicts the API action type. For each entity to fill an API argument, the entity resolution component 228 may search against stored entities and may resolve phrases into canonical values if there is a match. The inference engine 222 may insert the result of the entity resolution processing as a separate payload in the API-invoking request.

In some embodiments, the entity resolution component 228 may not perform entity resolution processing if the action selector component 224 predicts the Response action type. In such embodiments, there may not be a need for resolving a named entity to a specific entity for the Response action type, where the system is outputting a natural language output to inform the user 105 of performance of an action, request the user 105 to provide more information, etc. In invoking an API, there may be a need for a specific entity (thus a need for entity resolution processing) so that the API can execute with respect to the specific entity. In other embodiments, the entity resolution component 228 may perform entity resolution processing for Response action types.

The entity resolution component 228 may apply rules or other instructions to transform labels or tokens into a standard representation. The transformation may depend on the skill. For example, for a travel skill, the entity resolution component 228 may transform text data corresponding to "Boston airport" to the standard BOS three-letter code referring to the airport. The entity resolution component 228 can refer to an entity storage(s) (including data representing entities known to the system 120) to resolve the precise entity referred to in the input data 202. Specific entity combinations may also be tied to a particular source, which may then be used to resolve the entities in the input data 202. In the example "play songs by the [artist]," the entity resolution component 228 may reference a personal music catalog, user profile data, or the like. The entity resolution component 228 may output data including entity IDs corresponding to specific entities mentioned in the user input. The entity resolution component 228 may include multiple entity resolution components and each entity resolution component may be associated with one or more particular skills.

The entity resolution component 228 may use frameworks, linked to skills, to determine what database fields should be searched to determine the meaning of tagged entities, such as searching a user's gazetteer for similarity with the framework entities. For example, a framework for a music skill may indicate to attempt to resolve an identified object based on {Artist Name}, {Album Name}, and {Song name}, and another framework for the same skill might indicate to attempt to resolve an object modifier based on {Artist Name}, and resolve the object based on {Album Name} and {Song Name} linked to the identified {Artist Name}. If the search of the gazetteer does not resolve an entity using gazetteer information, the entity resolution component 228 may search a database of generic words. For example, if the input data 202 includes "play songs by the [artist]," after failing to determine an album name or song name called "songs" by "the [artist]," the entity resolution component 228 may search a vocabulary for the word "songs." In the alternative, generic words may be checked before the gazetteer information, or both may be tried, potentially producing two different entity data results.

In some embodiments, the inference engine 222 may employ one or more machine learning models configured to process data from the dialog focus component 216, the entity data from the NER component 218, the input data 202, and/or the other input data 204, along with the dialog models 214 stored at the dialog model storage 230 to predict an action.

The inference engine 222 may process the input data 202 using the selected dialog model(s) 214. In some embodiments, the dialog model(s) 214 may also process dialog context data from the dialog focus component 216. Each dialog model 214 may be a trained model, such as a sequence-to-sequence model, an encoder-decoder model, a neural network, etc., and may be trained using goal-oriented dialog training data. The training data may include dialog data between a user and a system and may include API call information related to goals expressed by the user.

Each of the selected dialog models 214 may generate response data based on the input data 202. The response data may include output text data, which may correspond to a prompt for more information (e.g., additional entity information). The response data may further include API call data and corresponding entities (arguments for the API call).

The action selector component 224 is configured to select at least one of the outputs of the dialog model(s) 214 for further processing. Each output may be associated with a corresponding category of function(s). The action selector component 224 may be a trained model, such as a classifier, and may determine a score for each of the outputs of the dialog models 214 based on each's similarity or relevance to the dialog context data from the dialog focus component 216, based on user preference data (from the profile storage 170), and/or based on the input data 202. The output of the dialog model 214 corresponding to the highest score is selected; if the output is an API call, one or more APIs 210 may be activated and a corresponding action carried out. If, however, the output is a prompt or other output data, the natural language generation (NLG) component 240 may be used to generate the output data 206 (which may be text data or other natural language representation data) and/or other output data 208 based on the output of the dialog model 214. In either case, the selected action may be used to update the dialog context data at the dialog focus component 216.

In some embodiments, the inference engine 222 may invoke the API 210 directly to perform an action. In other embodiments, the inference engine 222 may send a request to the controller 220 to invoke the API 210. In some embodiments, the inference engine 222 may send (via the controller 220 in some embodiments) a command to the skill component 190 to invoke the API 210, where the command may include entity data corresponding to the arguments of the API 210.

In some embodiments, the inference engine 222 may directly send data corresponding to the Response action type to the NLG component 240. In other embodiments, the inference engine 222 may send data corresponding to the Response action type to the controller 220 to send to the NLG component 240.

In some embodiments, the inference engine 222 may send, to the dialog focus component 216, a request for additional context data. This request may be based at least in part on the data needed to execute one or more of the dialog models 214. Alternatively or additionally, this request may be to obtain data to help in selecting one of the dialog models 214 from the dialog model storage 230.

In some cases, if there are any unresolved entities, the inference engine 222 (or the entity resolution component 228) may send to the skill component 190, unresolved entity data. The skill component 190 may process the unresolved entity data and, using the techniques described herein with respect to entity resolution processing, may return resolved entity data to the inference engine 222. The skill component 190 may be, for example, a communication skill, and may include a database of contact information for a user account and may resolve an ambiguous name in the unresolved entity data by, for example, resolving names in the contact information. The inference engine 222 (in some embodiments via the controller 220) may send resolved entity data to the dialog focus component 216 for updating the dialog state data for the current dialog session.

The inference engine 222 (via the controller 220 in some embodiments) may send response action data to the NLG component 240, where the response action data may be used by the NLG component 240 to generate text or other data representing a natural language output. For example, the response action data may include one or more nouns, one or more verbs, one or more objects, one or more subjects, and/or other parts of a sentence that the NLG component 240 can use to generate one or more natural language sentences.

The NLG component 240 may be a trained model, such as a neural network, and may generate output data 206 using the response action data from the inference engine 222. The output data 206 may have a natural feel and, in some embodiments, includes words and/or phrases specifically formatted for the user 105. As opposed to using templates to formulate responses, the NLG component 240 may include ML models trained from the various templates for forming the output data 206. For example, the NLG component 240 may analyze transcripts of local news programs, television shows, sporting events, or any other media program to obtain common components of a relevant language and/or region. As one illustrative example, the NLG component 240 may analyze a transcription of a regional sports program to determine commonly used words and/or phrases for describing scores and/or other sporting news for a particular region. The NLG component 240 may further receive, as input, data from the dialog focus component 216, such as the dialog history and the input data 204. The NLG component 240 may also receive other data that can be used to determine a structure for the output data 206, such as a level of formality in the dialog session (e.g., formal, informal, casual, etc.).

In some embodiments, the NLG component 240 may generate output data 206 based on one or more response templates. For example, the NLG component 240 may select a template in response to the question, "What is the weather currently like?" of the form: "The weather currently is $weather_information$." The NLG component 240 may analyze the logical form of the template to produce one or more natural language responses including markups and annotations to familiarize the response that is generated. In some embodiments, the NLG component 240 may determine which response is the most appropriate response to be selected. The selection may be based on past system responses of the present dialog session, past user inputs of the present dialog session, a level of formality of the present dialog session, and/or other data. Synthesized speech may be generated by processing the output data 206 using the TTS component 180.

Figure 3:
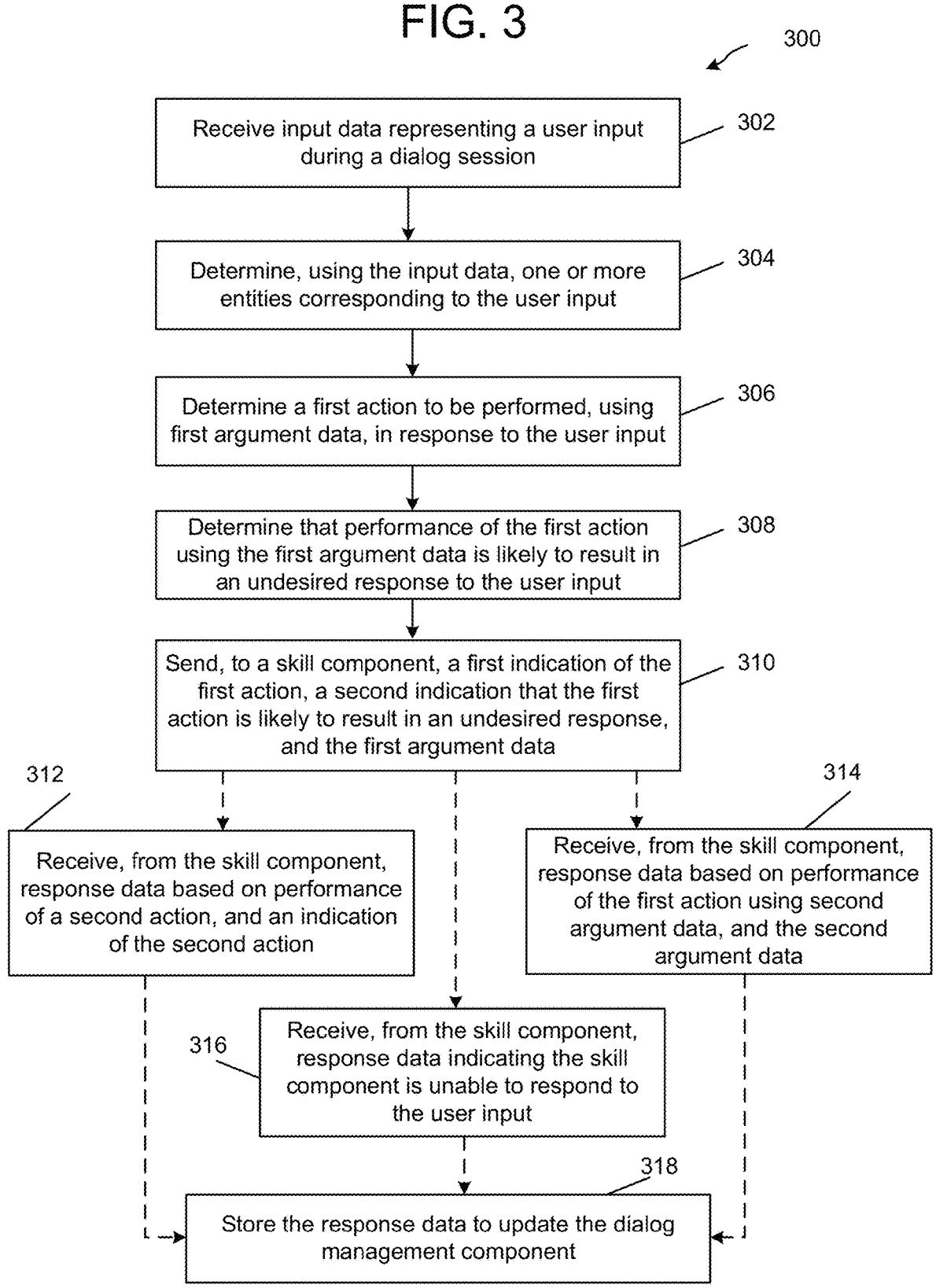
FIG. 3 illustrates an example process that may be performed by the dialog management component, according to embodiments of the present disclosure.

In some cases, the inference engine 222 may determine an action to be performed in response to a user input with a low confidence score. In such cases, the dialog management component 160 may call the skill component 190 to determine a correct action or an action with a higher confidence score to be performed in response to a user input. FIG. 3 illustrates an example process flow 300 that may be performed by one or more components of the dialog management component 160. At a step 302, the dialog management component 160 may receive input data (e.g., the input data 202) representing a user input during a dialog session. At a step 304, the NER component 218 may determine, using the input data, one or more entities corresponding to the user input.

At a step 306, the inference engine 222 may determine a first action to be performed, using first argument data, in response to the user input. As described above in relation to FIG. 2, the action selector component 224 may determine the first action (e.g., an API action, a Response action, or a System action), and the argument filling component 226 may determine the first argument data to be used to perform the first action (e.g., entities to be used to invoke an API or entities to be included in a response). The action selector component X224 may determine a confidence score corresponding to the first action, where the confidence score may represent how confident the action selector component 224 is in determining the first action or how likely performance of the first action is responsive to the user input. In some embodiments, the argument filling component 226 may determine a confidence score corresponding to the first argument data, where the confidence score may represent how confident the argument filling component 226 is in determining the first argument data or how likely the first argument data corresponds to the first action.

At a step 308, the inference engine 222 may determine that performance of the first action using the first argument data is likely to result in an undesired response to the user input. The inference engine 222 may make this determination based on the confidence score corresponding to the first action, the confidence score corresponding to the first argument data, or both. For example, if the confidence score corresponding to the first action does not satisfy a condition (e.g., is below a threshold value), then the inference engine 222 may determine that performance of the first action is likely to result in an undesired response to the user input. As another example, if the confidence score corresponding to the first argument data does not satisfy a condition (e.g., is below a threshold value), then the inference engine 222 may determine that performance of the first action using the first argument data is likely to result in an undesired response to the user input. In some embodiments, the condition, in view of which the inference engine 222 determines that performance of the first action using the first argument data is likely to result in an undesired response, may be different for different groups of skill components. For example, a first threshold value may be used to evaluate predicted actions and argument data for music skill components, while a second threshold value may be used to evaluate predicted actions and argument data for shopping skill components. The condition may be based on the variability of entities, actions, and other information related to the group of skill components.

As opposed to outputting an error (e.g., informing the user 105 that the system cannot respond to the user input, not outputting anything and failing silently, etc.), the dialog management component 160 may enable the skill component 190 to determine a correct action in response to the user input. At a step 310, the controller 220 (or another component of the dialog management component 160, such as the inference engine 222) may send, to the skill component 190, a first indication of the first action, a second indication that performance of the first action is likely to result in an undesired response, and the first argument data. In some embodiments, the controller 220 may also send the input data representing the user input to the skill component 190. The second indication (that performance of the first action is likely to result in an undesired response) may be a command to execute an out-of-domain API call at the skill component 190. In some embodiments, the dialog management component 160 may also send relevant dialog context data (e.g., dialog context data for the immediate previous turn, dialog context data for the entire dialog, dialog context data that was used by the inference engine 222 in analyzing the current user input, etc.) to the skill component 190.

The skill component 190, in this case, may be the skill component that is in focus for the current dialog session. A skill component may be in focus for a dialog session based on the skill component being invoked to respond to a first or prior user input of the dialog session, based on the user 105 invoking the skill component specifically (e.g., by including the skill name in the user input), and/or based on the dialog management component 160 determining which skill component corresponds to the goal of the dialog session. In some embodiments, another component (e.g., a skill selection component) implemented at the system 120 may determine which skill component is to be invoked/used for a dialog session. The skill selection component may make this determination using the first user input of the dialog session. In some cases, the user 105 may request the system to start/open/launch a particular skill (e.g., the user 105 may say "Open [skill name]" or "Play music with [skill name]." In other cases, the skill selection component may use stored data representing sample invocation phrases/inputs that trigger particular skills. For example, a first sample invocation may be "I need directions" which may trigger a navigation skill. The skill selection component may send an indication of the selected/invoked skill component 190 (e.g., a skill identifier associated with the skill component 190, a skill name associated with the skill component 190, etc.) to the dialog management component 160, and based on receiving this indication, the dialog management component 160 may determine that the skill component 190 is in focus.

The skill component 190 may process the data received in step 310, and make one of three determinations. One of the determinations may be that the first action is incorrect for responding to the user input. Another determination may be that the first action is correct for responding to the user input, but that the first argument data is incorrect for the first action. Another determination may be that the skill component 190 is unable to respond to the user input. The skill component 190 may use similar or different techniques as the inference engine 222 to make the foregoing determinations. The skill component 190 may use different resources (e.g., database, catalogs, machine learning models, etc.), than the inference engine 222, to make the foregoing determinations, thus, determining (in some cases) an action and/or argument data different than the one predicted by the inference engine 222. The skill component 190 may have access to more resources than the inference engine 222 in making the foregoing determinations. In other embodiments, the skill component 190 may implement a particular fallback technique (e.g., fallback rule that indicates a replacement action and/or argument data for certain entity data, actions, argument data, or combination thereof), that may not be implemented at the inference engine 222, that enables the skill component 190 to perform dialog recovery based on the particular entity data (determined by the NER component 218), the particular action predicted by the inference engine 222, and/or the particular argument data predicted by the inference engine 222. Based on the fallback technique, the skill component 190 may make the foregoing determinations. For example, the fallback technique may indicate that if the inference engine 222 predicts a first action based on first entity data, then the correct action is a second action. In some embodiments, the skill component 190 may request dialog context data, for example the data stored at the dialog focus component 216, to aid in making the foregoing determinations.

In the case that the skill component 190 determines that the first action is incorrect, the skill component 190 may determine a second (correct) action that will generate a desired response to the user input. In such cases, at a step 312, the controller 220 (or another component of the dialog management component 160) may receive, from the skill component 190, response data based on performance of the second action and an indication of the second action. The response data may be an output of an API (different from the API corresponding to the first action). The skill component 190 may invoke the API corresponding to the second action using the first argument data or using different argument data (determined by the skill component 190 using the dialog context data from the dialog focus component 216 and/or using the input data representing the user input). The indication of the second action may be a name of the API invoked to generate the response data. The response data may be a natural language output, and the indication of the second action may be a name of the Response action used to generate the response data. In some embodiments, the second action (e.g., an API or a Response) may correspond to an API 210 or a response included in a dialog model 214, and may not be new functionality that is not known/available to the dialog management component 160. In some embodiments, the skill component 190 may also send, to the controller 220, the argument data used to perform the second action. In other embodiments, the dialog management component 160 may determine the argument data used to perform the second action based on the response data received at the step 312.

In the case that the skill component 190 determines that the first action is correct but the first argument data is incorrect, the skill component 190 may determine second (correct) argument data to be used to perform the first action. In such cases, at a step 314, the controller 220 (or another component of the dialog management component 160) may receive, from the skill component 190, the second argument data, and response data based on performance of the first action using the second argument data. The skill component 190 may determine the second argument data using the dialog context data from the dialog focus component 216 and/or using the input data representing the user input.

In the case that the skill component 190 determines that it is unable to respond to the user input, the controller 220, at a step 316, may receive, from the skill component 190, response data indicating that the skill component 190 is unable to respond to the user input. The skill component 190 may determine that it is unable to respond to the user input using the APIs 210 and/or the dialog models 214 associated with the skill component 190.

At a step 318, the dialog focus component 216 may store the response data to update the dialog management component 160. The stored response data may be used, at a later time, to update the inference engine 222 so that it correctly predicts the action and arguments for a future user input. The dialog focus component 216 may also store the response data to update the dialog context for the current dialog session. For example, the dialog focus component 216 may store data indicating the first action or the second action was performed in response to the user input, data indicating that the first argument data or second argument data was used to respond to the user input, or that the skill component 190 was unable to respond to the user input. The foregoing stored data may be used by the inference engine 222 in predicting actions and arguments for subsequent user inputs of the current dialog session. Thus, the skill component 190 is able to recover an output to a user input which may have otherwise resulted in an error. The recovered output is then propagated through the dialog session (by the dialog focus component 216), so that the system outputs desired responses to subsequent user inputs.

Figure 4:
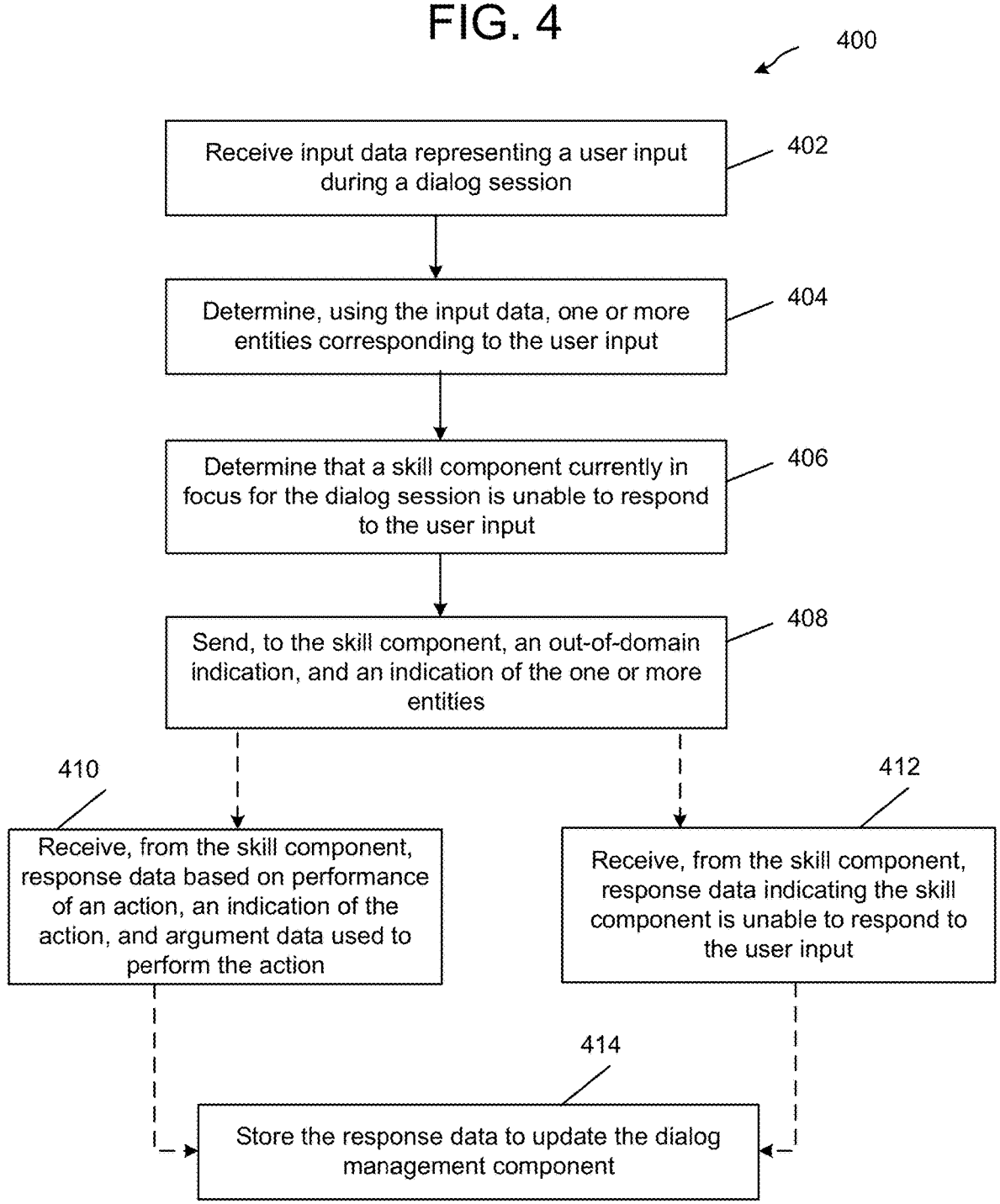
FIG. 4 illustrates an example process that may be performed by the dialog management component, according to embodiments of the present disclosure.

In some cases, the inference engine 222 may not be able to determine an action that can be performed in response to the user input by the skill component 190 (based on the APIs 210 associated with the skill component 190 and/or based on the dialog models 214 associated with the skill component 190). As opposed to outputting an error, the dialog management component 160, in such cases, may determine an out-of-domain API as the action to be performed in response to the user input. FIG. 4 illustrates an example process flow 400 that may be performed by one or more components of the dialog management component 160. At a step 402, the dialog management component 160 may receive input data (e.g., the input data 202) representing a user input during a dialog session. At a step 404, the NER component 218 may determine, using the input data, one or more entities corresponding to the user input.

At a step 406, the inference engine 222 may determine that the skill component 190, currently in focus for the dialog session, is unable to respond to the user input. The inference engine 222 may make this determination based on processing the dialog models 214 associated with the skill component 190, and determining that none of the dialog models 214 correspond to the user input and provide a suitable response for the user input. For example, a movie ticket skill component may be in focus (based on the prior user input(s) relating to requesting movie show times, requesting movie tickets reservations, or other similar requests), and the current user input may be "who is [person name]?" The inference engine 222 may determine that none of the dialog models 214 available at the dialog model storage 230, and corresponding to the skill component 190, are able to respond to such a user input, when the prior user inputs of the dialog session relate to movie show times or movie tickets and the current user input relates to information for a person.

Additionally or alternatively, the inference engine 222 may determine that the skill component 190 (currently in focus for the dialog session) is unable to respond to the user input based on the APIs 210 associated with the skill component 190. The action selector component 224 may determine that an API action type is to be used to respond to the user input (based on processing the dialog models 214 associated with the skill component 190). However, the action selector component 224 may be unable to identify an API from the in-focus skill component's APIs 210 that outputs data responsive to the user input and/or that takes as arguments data available at the dialog focus component 216 or included in the user input. Continuing with the above example, where the movie ticket skill component may be in focus, the action selector component 224 may be unable to find an API, from the APIs 210 of the movie skill component, that outputs information for a person or that takes as arguments movie information.

In such cases, where the inference engine 222 determines that the skill component 190 is unable to respond to the user input, the issue may be that the inference engine 222 needs to be retrained/reconfigured so that it can predict the appropriate action for the user input, as opposed to the APIs 210 and/or the dialog models 214 not being configured to respond to the user input.

When the inference engine 222 determines (at step 406) that the skill component 190 is unable to respond to the user input, the inference engine 222 may generate and output an out-of-domain indication. In some embodiments the inference engine 222 may determine an out-of-domain API call is to be invoked in response to the user input. At a step 408, the controller 220 (or another component of the dialog management component 160) may send, to the skill component 190, the out-of-domain indication and an indication of the one or more entities (determined at step 404). The controller 220 may send, to the skill component 190, a command to execute an out-of-domain API, and may send data representing the entities corresponding to the user input as the arguments for the API call. The data representing the entities may be the entity data outputted by the NER component 218. The controller 220, in some embodiments, may also send the input data representing the user input. In some embodiments, the controller 220 may also send, to the skill component 190, information regarding the processing performed by the inference engine 222 (e.g., which dialog models 214 were analyzed, which APIs 210 were analyzed, etc.). In some embodiments, the dialog management component 160 may also send relevant dialog context data (e.g., dialog context data for the immediate previous turn, dialog context data for the entire dialog, dialog context data that was used by the inference engine 222 in analyzing the current user input, etc.) to the skill component 190.

The skill component 190 may be configured to process with respect to the out-of-domain indication (e.g., the out-of-domain API call). Using the received data (e.g., the entity data and/or the input data), the skill component 190 may determine an action to be performed in response to the user input. The action to be performed may be an API call to an API 210, a natural language response included in a dialog model 214, or both. The skill component 190 may use similar or different techniques as the inference engine 222 to determine the action. The skill component 190 may use one or more machine learning models to determine the action. The skill component 190 may request dialog context data for the current dialog session stored at the dialog focus component 216 to aid in determining the action. The skill component 190 may use different resources (e.g., database, catalogs, machine learning models, etc.), than the inference engine 222, to determine the action, thus, determining (in some cases) an action other than an out-of-domain action that is predicted by the inference engine 222. The skill component 190 may have access to more resources than the inference engine 222 in determining the action. In other embodiments, the skill component 190 may implement a particular fallback technique (e.g., fallback rule that indicates an action and/or argument data for certain entity data and/or dialog context data), that may not be implemented at the inference engine 222, that enables the skill component 190 to perform dialog recovery based on particular entity data (determined by the NER component 218) and/or particular dialog context data. For example, the fallback technique may indicate that if the user input corresponds to first entity data, then the correct action is a first action.

In some cases, the skill component 190 may determine the action responsive to the user input, and in other cases the skill component 190 may be unable to determine an action responsive to the user input. In the case that the skill component 190 is able to determine the action, the controller 220 (or another component of the dialog management component 160) may receive, from the skill component 190 at a step 410, response data based on performance of the action, an indication of the action, and argument data used to perform the action. The response data may be an output of an API call, a natural language response, or both. The indication of the action may be a name of the API, a name of the response used to generate the natural language response, or both. The argument data may be the entities used to invoke the API, the entities used to generate the natural language response, or both.

In the case that the skill component 190 is unable to determine an action responsive to the user input, the controller 220 (or another component of the dialog management component 160) may receive, from the skill component 190 at a step 412, response data indicating the skill component 190 is unable to respond to the user input. The response data may be a natural language response that is to be outputted to the user 105, or may be an indication that the skill component is unable to respond. In this case, the dialog management component 160, using the NLG component 240, may output a natural language output representing the skill component 190 is unable to respond. For example, the natural language output may be "Sorry, I don't understand," "Sorry, I cannot find the requested information", "Sorry, I cannot respond" or other similar outputs.

At a step 414, the dialog focus component 216 may store the response data to update the dialog management component 160. The stored response data may be used, at a later time, to update the inference engine 222 so that it correctly predicts the action for future user inputs. The dialog focus component 216 may also store the response data to update the dialog context for the current dialog session. For example, the dialog focus component 216 may store data indicating the action was performed, using the argument data, in response to the user input, or that the skill component 190 was unable to respond to the user input. The foregoing stored data may be used by the inference engine 222 in predicting actions and arguments for subsequent user inputs of the current dialog session. Thus, the skill component 190 is able to recover an output to a user input which may have otherwise resulted in an error. The recovered output is then propagated through the dialog session, so that the system outputs desired responses to subsequent user inputs.

In some embodiments, based on the determination that the skill component 190 is unable to respond to the user input or that an action associated with the skill component 190 is likely to result in an undesired response, the inference engine 222 may predict the action, responsive to the user input) to be an out-of-domain natural language response. The out-of-domain natural language response may inform the user 105 that the system is unable to respond to the user input. In such embodiments, the controller 220 may convert the action of out-of-domain natural language response to an action of invoking an out-of-domain API call. When the controller 220 receives an action of Response action type from the inference engine 222, the controller 220 sends data to the NLG component 240 for processing. When the controller 220 receives an action of API action type from the inference engine 222, the controller 220 sends data to the skill component 190 for processing. Thus, changing the action of out-of-domain natural language response to the action of invoking an out-of-domain API call enables routing of data to the skill component 190, in turn providing the skill component 190 an opportunity to perform dialog recovery.

Figure 5:
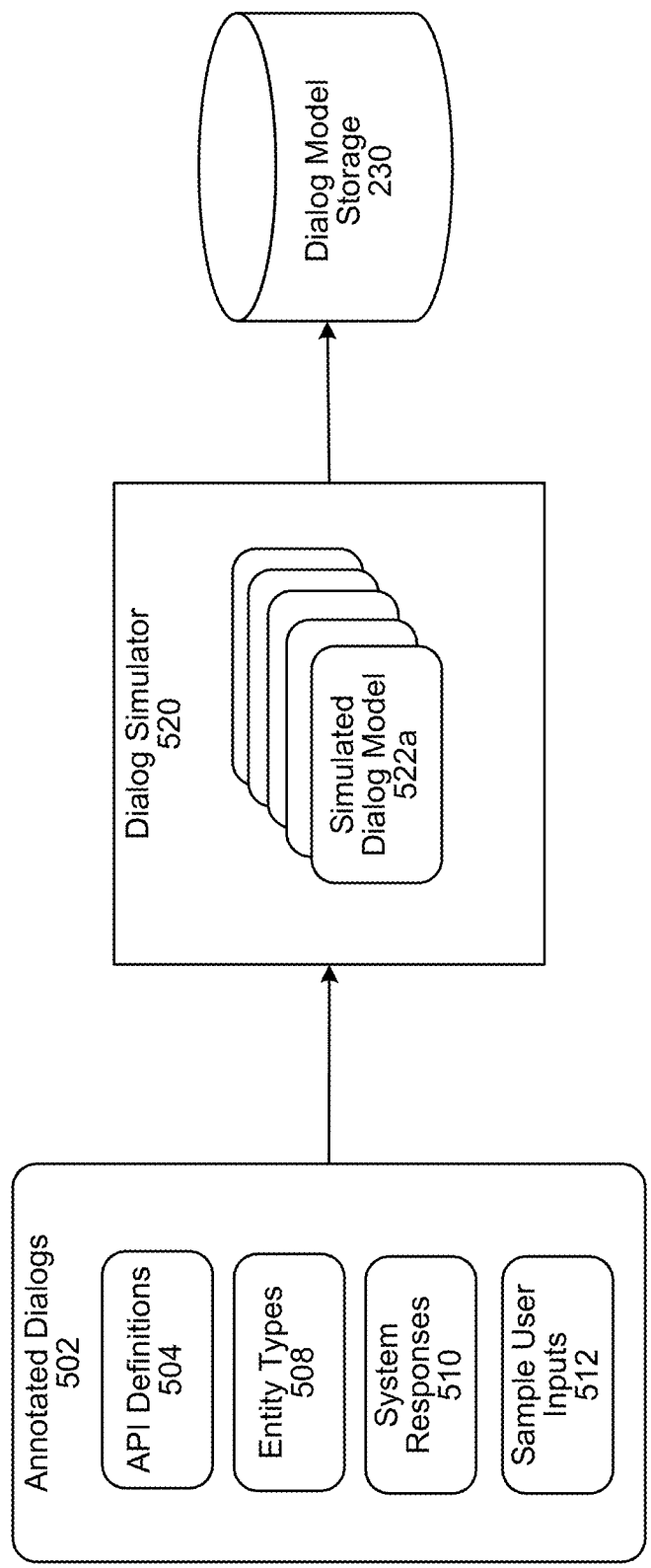
FIG. 5 is a conceptual diagram illustrating a dialog simulator component to generate dialog models for use by the dialog management component, according to embodiments of the present disclosure.

FIG. 5 is a conceptual diagram illustrating a dialog simulator component 520 to generate dialog models 214 for use by the dialog management component 160. The dialog simulator component 520 may receive one or more annotated dialogs 502. Each of the annotated dialogs 502 may be associated with one or more of: API definitions 504, entity types 508, system responses 510, and sample user inputs 512. The annotated dialog 502 may, for example, indicate an API definition 504 that is to be invoked when a user provides a sample user input 512. As another example, the annotated dialog 502 may indicate a system response 510 to be outputted when a user provides a sample user input 512. As yet another example, the annotated dialog 502 may indicate an API definition 504 that is to be invoked when a user provides a sample user input 512, and a system response 510 that is to be outputted after the API has completed its function. As yet another example, the annotated dialog 502 may indicate an API definition 504 to be invoked and/or a system response 510 to be outputted when an entity type 508 is stored/available in the dialog context data.

A simulated dialog 522 may be generated by the dialog simulator component 520 by generalizing the annotated dialogs 502, which may be provided by a skill developer or another system, to cover various ways a user may interact with a skill. The simulated dialogs 522 may be stored as the dialog models 214. For example, a user may say variations of utterances to invoke the same functionality, provide requested information out of order, or change previously provided information. The dialog simulator component 520 may generate data, for the dialog model 214, by expanding the annotated dialogs—including entity types, API definitions, sample user inputs, and sample system responses—into tens of thousands of dialog variants, phrasing variations, and uncommon alternatives to create a wider range of possible dialog paths. These expanded annotated dialogs may be stored in the dialog model storage 230, and may be used by the dialog management component 160 as described above. A dialog model 214 may include data representing a flow of a dialog based on sample user inputs, entity types, API calls, system responses, etc.

Figure 6:
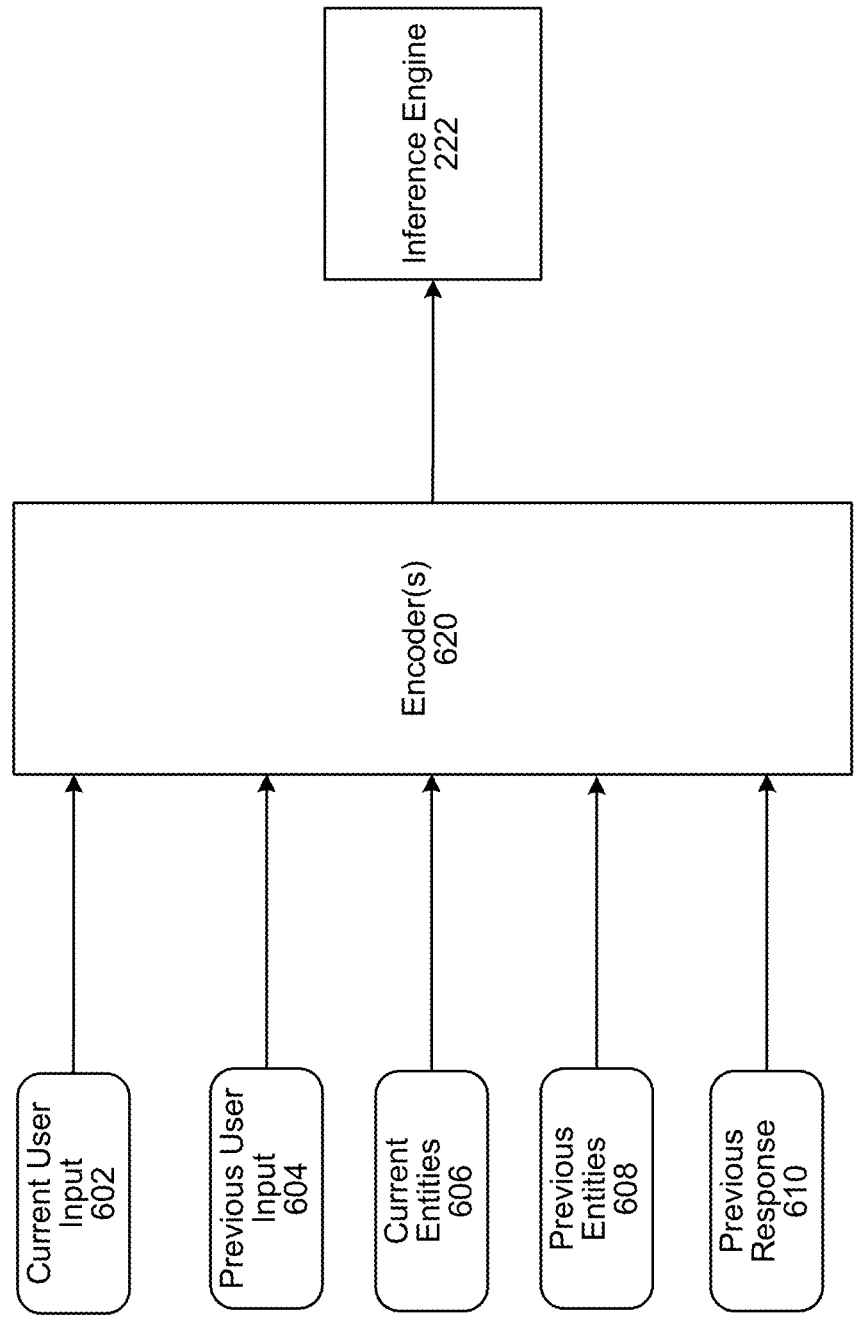
FIG. 6 is a conceptual diagram illustrating data that may be processed by an inference engine of the dialog management component, according to embodiments of the present disclosure.

FIG. 6 conceptually illustrates the types of data that may be processed by the inference engine 222. In some embodiments, all types of data may be inputted into a single encoder 620. In other embodiments, each type of data may be inputted into a separate different encoder 620. The output of the encoder(s) 620 (e.g., encoded data) may be inputted to the inference engine 222 for processing.

In example embodiments, the encoder(s) 620 may take as input a word sequence of L length, and project the word sequence to an F-dimensional vector, where F may be a configurable length. The encoder(s) 620 may output vectors of the same length regardless of the length of input word sequence. The output vector of the encoder(s) 620 may also be referred to as an embedding or a word embedding. The encoder(s) 620 may be a recurrent neural network, LSTM, or other type of ML model.

One type of data that the inference engine 222 may process is current user input data 602, which may correspond to a user input of the current turn of the dialog session. Another type of data that the inference engine 222 may process is previous user input data 604, which may correspond to one or more user inputs of previous turns of the dialog session (i.e. turns that took place before the current turn of the dialog session). The current user input data 602 and the previous user input data 604 may be text data, token data, or ASR data corresponding to the user input. The previous user input data 604 may be a matrix, where each row (or column) may correspond to a different previous turn of the dialog session.

The inference engine 222 may also process current entities data 606, which may correspond to one or more entities included in the user input of the current turn. The inference engine 222 may also process previous entities data 608, which may correspond to one or more entities included in the user inputs of the previous turns. The current entities data 606 and the previous entities data 608 may also include an entity type corresponding to each of the entities. The previous entities data 608 may also include a turn identifier to identify which turn of the dialog session the entities correspond to.

Another type of data that the inference engine 222 may process is previous response data 610, which may correspond to one or more system responses in the previous turns of the dialog session. The previous response data 610 may be text data corresponding to a natural language output presented by the system in response to a user input. The previous response data 610 may additionally or alternatively be data representing an API call, inputs used for the API call, and/or the output of the API call. The previous response data 610 may be a matrix where each row (or column) may correspond to a different previous turn of the dialog session.

The system 120 may use other components illustrated in FIG. 1. The various components shown in FIG. 1 may be located on a same or different physical devices. Communication between various components may occur directly or across the network(s) 199.

A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 720 (shown in FIG. 7). The wakeword detection component 720 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 720 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 720 detects a wakeword, the device 110 may "wake" and begin transmitting audio data 711, representing the audio, to the system 120. The audio data 711 may include the detected wakeword, or the device 110 may remove the portion of the audio data, corresponding to the detected wakeword, prior to sending the audio data 711 to the system 120.

Referring to FIG. 1, the orchestrator component 130 may be configured to, among other things, coordinate data transmissions between components of the system 120. The orchestrator component 130 may receive audio data from the device 110, and send the audio data to the ASR component 150.

The ASR component 150 transcribes the audio data into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data based on a similarity between the audio data and pre-established language models. For example, the ASR component 150 may compare the audio data 711 with models for sounds (e.g., subword units, such as phonemes, etc.) and sequences of sounds to identify words that match the sequence of sounds of the speech represented in the audio data.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 130. The orchestrator component 130 may send the text data or ASR output data, depending on the type of natural language input received, to the dialog management component 160.

In some embodiments, the system 120 may include an NLU component, and the orchestrator 130 may send the ASR output data to the NLU component. The NLU component processes the ASR output data or text data to determine one or more NLU hypotheses embodied in NLU output data. The NLU component may perform intent classification (IC) processing on the ASR output data or text data to determine an intent of the natural language input. An intent corresponds to an action to be performed that is responsive to the natural language input. To perform IC processing, the NLU component may communicate with a database of words linked to intents. For example, a music intent database may link words and phrases such as "quiet," "volume off," and "mute" to a <Mute>intent. The NLU component identifies intents by comparing words and phrases in ASR output data or text data to the words and phrases in an intents database. In some embodiments, the NLU component may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component may be linked to one or more grammar frameworks with entity types to be populated with entity values. Each entity type of a grammar framework corresponds to a portion of ASR output data or text data that the NLU component believes corresponds to an entity value. For example, a grammar framework corresponding to a <PlayMusic>intent may correspond to sentence structures such as "Play {Artist Name}," "Play {Album Name}," "Play {Song name}," "Play {Song name} by {Artist Name}," etc.

For example, the NLU component may perform NER processing to identify words in ASR output data or text data as subject, object, verb, preposition, etc. based on grammar rules and/or models. Then, the NLU component may perform IC processing using the identified verb to identify an intent. Thereafter, the NLU component may again perform NER processing to determine a grammar model associated with the identified intent. For example, a grammar model for a <PlayMusic>intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic>intent.

The NLU component may generate NLU output data including one or more NLU hypotheses, with each NLU hypothesis including an intent and optionally one or more entity types and corresponding entity values. In some embodiments, the NLU component may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component). In at least some embodiments, the system 120 may implement a spoken language understanding (SLU) component configured to process audio data 711 to determine NLU output data.

The SLU component may be equivalent to a combination of the ASR component 150 and the NLU component. Yet, the SLU component may process audio data 711 and directly determine the NLU output data, without an intermediate step of generating ASR output data. As such, the SLU component may take audio data 711 representing a spoken natural language input and attempt to make a semantic interpretation of the spoken natural language input. That is, the SLU component may determine a meaning associated with the spoken natural language input and then implement that meaning. For example, the SLU component may interpret audio data 711 representing a spoken natural language input in order to derive a desired action. The SLU component may output a most likely NLU hypothesis, or multiple NLU hypotheses associated with respective confidence or other scores (such as probability scores, etc.).

The system 120 may include one or more skill components 190 and/or may communicate with one or more skill systems 125. A "skill" may refer to software, that may be placed on a machine or a virtual machine (e.g., software that may be launched in a virtual instance when called), configured to perform one or more actions in response to user inputs processed by the dialog management component 160. A skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain.

The system 120 may include a TTS component 180 that generates audio data including synthesized speech. The data input to the TTS component 180 may come from a skill 125, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The system 120 may include a user recognition component 195. The user recognition component 195 may recognize one or more users using various data. The user recognition component 195 may take as input the audio data 711. The user recognition component 195 may perform user recognition by comparing speech characteristics, in the audio data 711, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 7:
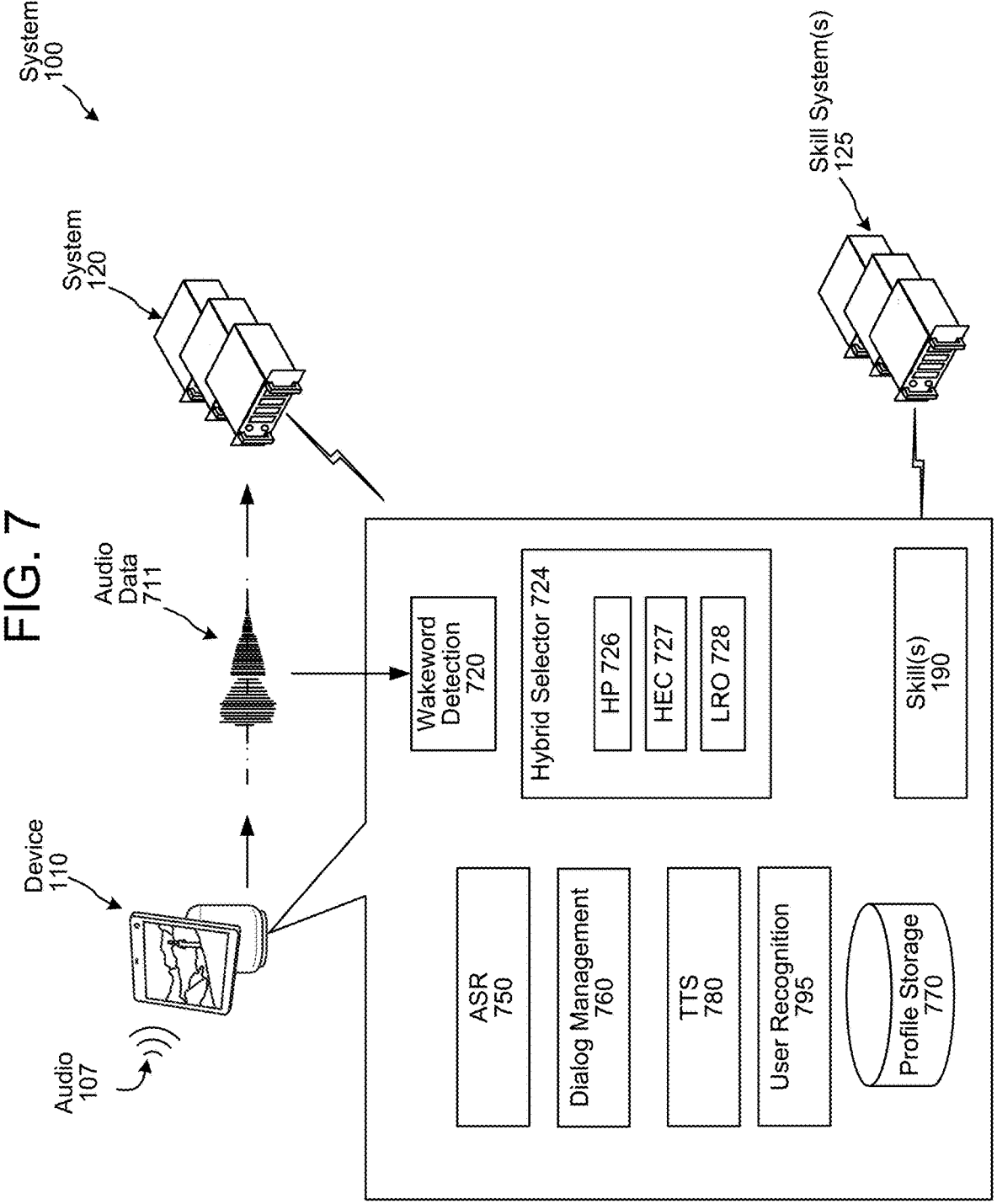
FIG. 7 is a conceptual diagram illustrating components that may be included in a device, according to embodiments of the present disclosure.

The foregoing describes illustrative components and processing of the system 120. The following describes illustrative components and processing of the device 110. As illustrated in FIG. 7, in at least some embodiments the system 120 may receive audio data 711 from the device 110, to recognize speech corresponding to a spoken natural language in the received audio data 711, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 720 configured to detect a wakeword (e.g., "Alexa") that indicates to the device 110 that the audio data 711 is to be processed for determining NLU output data. In at least some embodiments, a hybrid selector 724, of the device 110, may send the audio data 711 to the wakeword detection component 720. If the wakeword detection component 720 detects a wakeword in the audio data 711, the wakeword detection component 720 may send an indication of such detection to the hybrid selector 724. In response to receiving the indication, the hybrid selector 724 may send the audio data 711 to the system 120 and/or an on-device ASR component 750. The wakeword detection component 720 may also send an indication, to the hybrid selector 724, representing a wakeword was not detected. In response to receiving such an indication, the hybrid selector 724 may refrain from sending the audio data 711 to the system 120, and may prevent the ASR component 750 from processing the audio data 711. In this situation, the audio data 711 can be discarded.

The device 110 may conduct its own speech processing using on-device language processing components (such as an on-device SLU component, an on-device ASR component 750, and/or an on-device NLU component) similar to the manner discussed above with respect to the system-implemented ASR component 150, and NLU component. The device 110 may also internally include, or otherwise have access to, other components such as one or more skills 190, a user recognition component 795 (configured to process in a similar manner to the system-implemented user recognition component 195), profile storage 770 (configured to store similar profile data to the system-implemented profile storage 170), a TTS component 780 (configured to process in a similar manner to the system-implemented TTS component 180), and other components. In at least some embodiments, the on-device profile storage 770 may only store profile data for a user or group of users specifically associated with the device 110.

The device 110 may also include a dialog management component 760 that may be configured to perform operations similar to the dialog management component 160, may include similar components to the dialog management component 160 described above, and may be personalized for the user 105 of the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 724, of the device 110, may include a hybrid proxy (HP) 726 configured to proxy traffic to/from the system 120. For example, the HP 726 may be configured to send messages to/from a hybrid execution controller (HEC) 727 of the hybrid selector 724. For example, command/directive data received from the system 120 can be sent to the HEC 727 using the HP 726. The HP 726 may also be configured to allow the audio data 711 to pass to the system 120 while also receiving (e.g., intercepting) this audio data 711 and sending the audio data 711 to the HEC 727.

In at least some embodiments, the hybrid selector 724 may further include a local request orchestrator (LRO) 728 configured to notify the ASR component 750 about the availability of the audio data 711, and to otherwise initiate the operations of on-device language processing when the audio data 711 becomes available. In general, the hybrid selector 724 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 711 is received, the HP 726 may allow the audio data 711 to pass through to the system 120 and the HP 726 may also input the audio data 711 to the ASR component 750 by routing the audio data 711 through the HEC 727 of the hybrid selector 724, whereby the LRO 728 notifies the ASR component 750 of the audio data 711. At this point, the hybrid selector 724 may wait for response data from either or both the system 120 and/or the on-device language processing components. However, the disclosure is not limited thereto, and in some examples the hybrid selector 724 may send the audio data 711 only to the ASR component 750 without departing from the disclosure. For example, the device 110 may process the audio data 711 on-device without sending the audio data 711 to the system 120.

The ASR component 750 is configured to receive the audio data 711 from the hybrid selector 724, and to recognize speech in the audio data 711, and the on-device NLU component is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component) may be selected as usable to respond to a natural language input, and local response data may be sent (e.g., local NLU output data, local knowledge base information, internet search results, and/or local directive data) to the hybrid selector 724, such as a "ReadyToExecute" response. The hybrid selector 724 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 711 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 8:
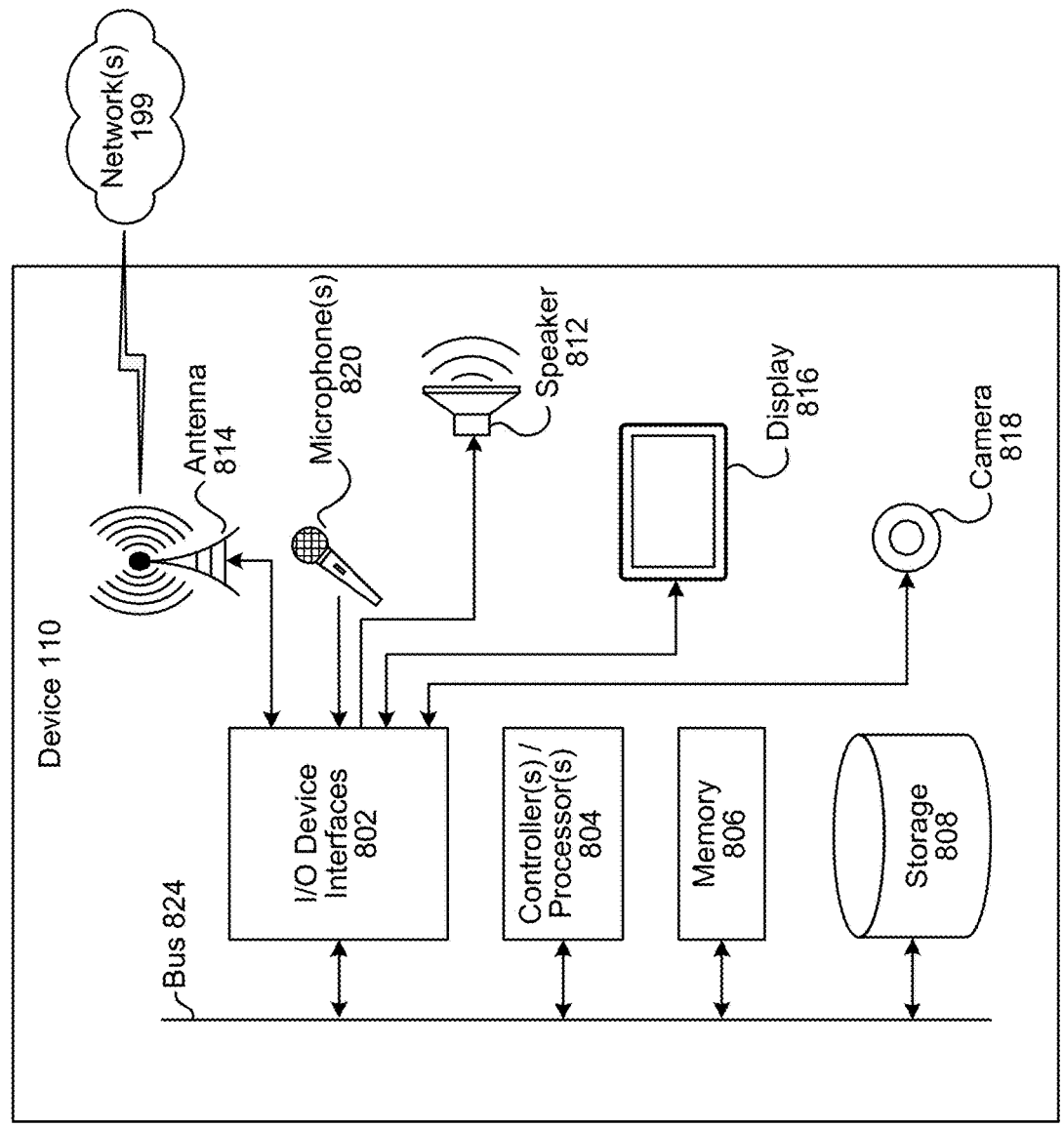
FIG. 8 is a block diagram conceptually illustrating example components of a device, according to embodiments of the present disclosure.
Figure 9:
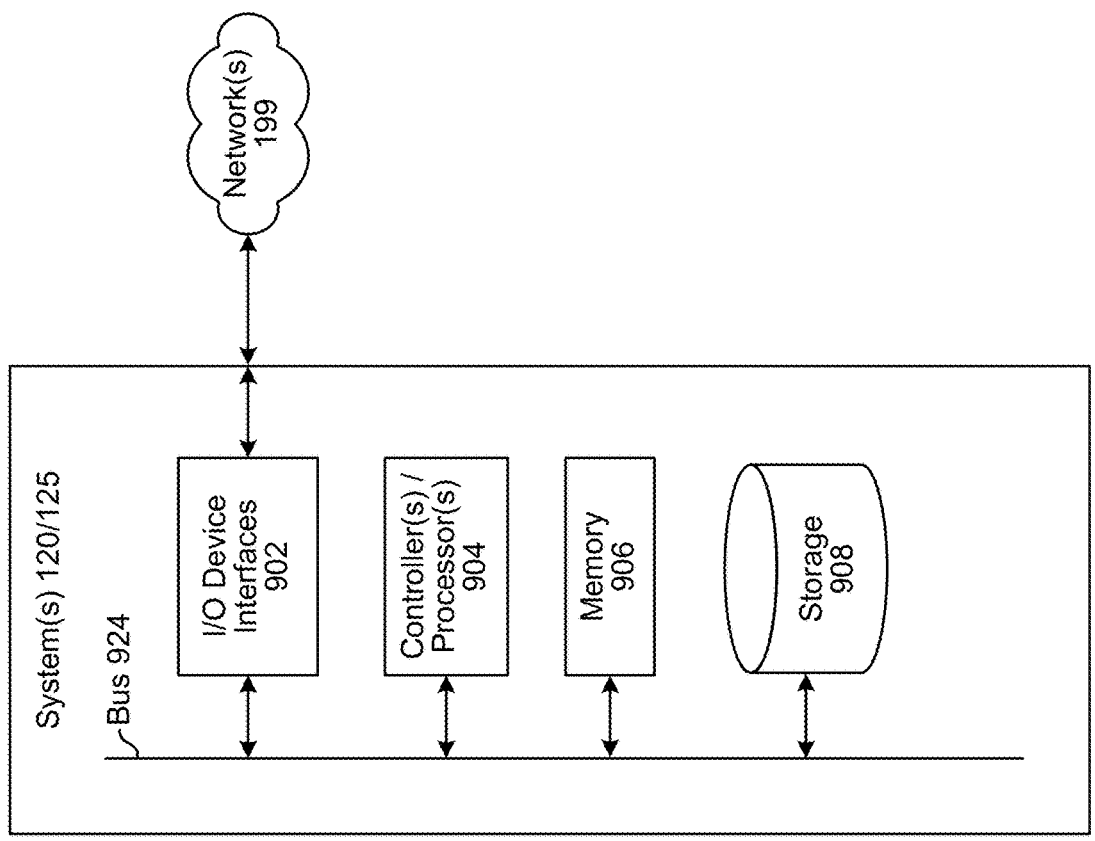
FIG. 9 is a block diagram conceptually illustrating example components of a system, according to embodiments of the present disclosure.

FIG. 8 is a block diagram conceptually illustrating a device 110 of the system 100. FIG. 9 is a block diagram conceptually illustrating example components of a system, such as the system 120 and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the system 120 and/or skill 125 may include their own dedicated processors, memory, and/or storage. Alternatively, one or more of the components of the device 110, the system 120 and/or skill 125 may utilize the I/O interfaces (802/902), processor(s) (804/904), memory (806/906), and/or storage (808/908) of the device 110, the system 120 and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120 and the skill system 125, as described herein, are illustrative, and may be located as a stand-alone device or may be included, in whole or in part, as a component of a larger device or system.

Figure 10:
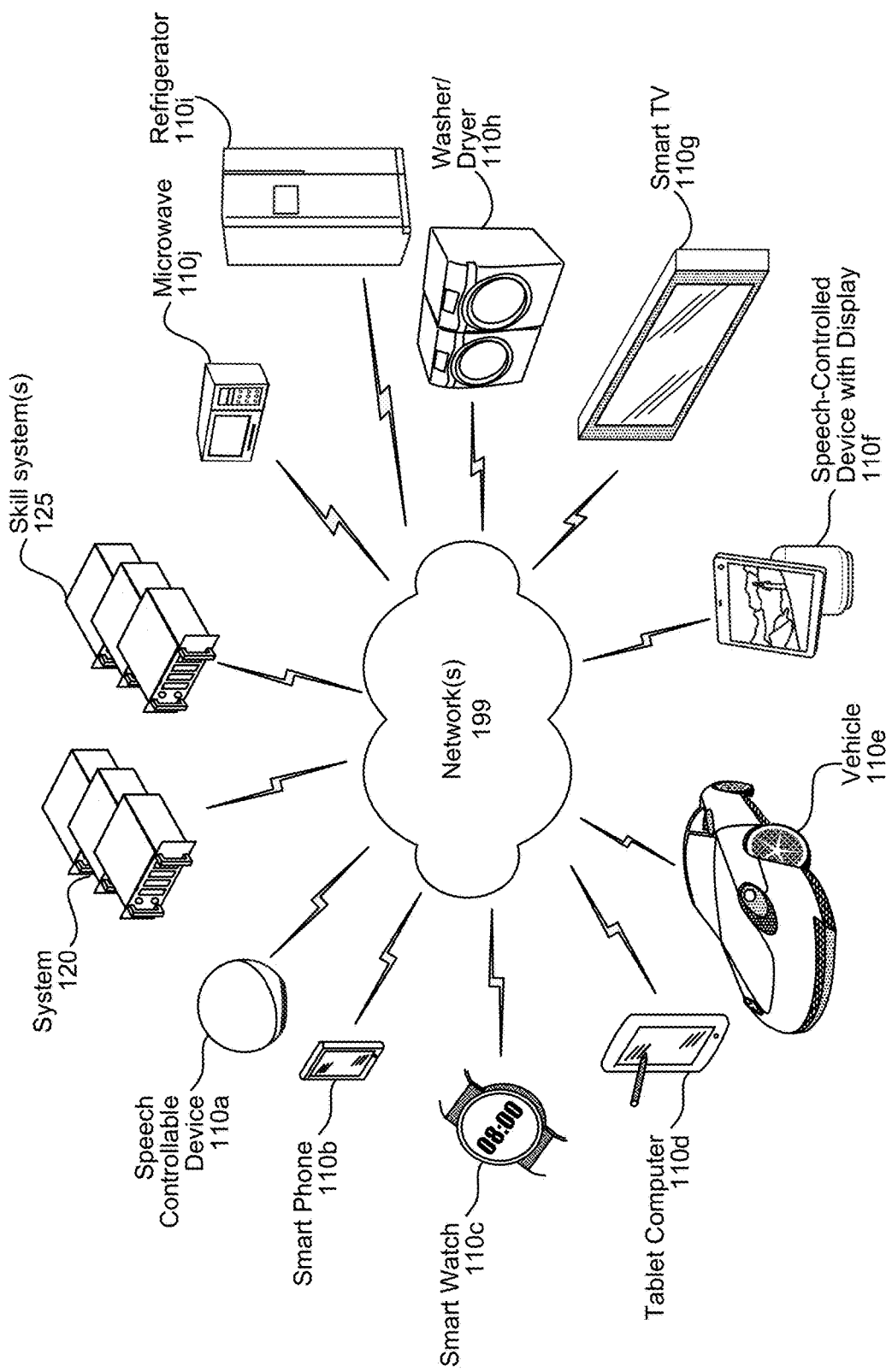
FIG. 10 illustrates an example of a computer network for use with the overall system, according to embodiments of the present disclosure.

As illustrated in FIG. 10, multiple devices (110*a*-110*j*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110*a*, a smart phone 110*b*, a smart watch 110*c*, a tablet computer 110*d*, a vehicle 110*e*, a speech-controllable display device 110*f*, a smart television 110*g*, a washer/dryer 110*h*, a refrigerator 110*i*, and/or a microwave 110*j* may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a device, first audio data representing a first spoken input associated with a dialog session identifier;
determining first automatic speech recognition (ASR) data corresponding to the first audio data;
determining, using the first ASR data, first entity data corresponding to the first spoken input;
determining, using the first ASR data and the first entity data, a first action to be performed in response to the first spoken input;
sending, to a skill component, a first command to perform the first action using the first entity data;
receiving, from the skill component, first response data based on performance of the first action;
sending, to the device, the first response data;
storing first dialog context data including the first entity data, the first action and the first response data;
receiving, from the device, second audio data representing a second spoken input associated with the dialog session identifier;
determining second ASR data corresponding to the second audio data;
determining, using the second ASR data, second entity data corresponding to the second spoken input;
determining, using the second ASR data, the second entity data and the first dialog context data, a second action to be performed in response to the second spoken input;
determining that performance of the second action is likely to result in an undesired response to the second spoken input;
sending, to the skill component, the second ASR data, the second entity data, a first indication of the second action, and a second indication representing performance of the second action is likely to result in the undesired response;
receiving, from the skill component, second response data corresponding to the second spoken input, wherein the second response data is determined based on performance of a third action using the second entity data, and performance of the third action is based on the second indication;
receiving, from the skill component, a third indication of the third action;
sending, to the device, the second response data; and
storing second dialog context data including the second entity data, the third action and the second response data.

2. The computer-implemented method of claim 1, further comprising:
determining by an inference engine and based on determining that performance of the first action is likely to result in an undesired response to the first spoken input, an out-of-domain natural language response to be sent to a natural language generation component;

determining, by a controller component and based on the out-of-domain natural language response, an out-of-domain API corresponding to the skill component; and sending, to the skill component, a command to execute the out-of-domain API using the second ASR data and the second entity data.

3. The computer-implemented method of claim 1, wherein determining the second action to be performed in response to the second spoken input comprises:

processing, by an inference engine, the second ASR data, the second entity data and the first dialog context data using one or more dialog models associated with the skill component; and determining, based on the processing using the one or more dialog models, the second action and a confidence score representing a likelihood of the second action being responsive to the second spoken input, and wherein determining that performance of the second action is likely to result in an undesired response to the second spoken input is based on the confidence score.

4. The computer-implemented method of claim 1, further comprising:

receiving a plurality of dialog models associated with the skill component;

receiving input data corresponding a user input associated with a second dialog session identifier;

determining, using the input data, third entity data corresponding to the user input;

processing, using the plurality of dialog models, the input data and the third entity data to determine that the skill component is unable to respond to the user input;

determining, based on determining that the skill component is unable to respond to the user input, a fourth action responsive to the user input, wherein the fourth action is an out-of-domain API call; and sending, to the skill component, the third entity data and a command to execute the out-of-domain API call.

5. A computer-implemented method comprising:

receiving first input data corresponding to a first user input associated with a dialog session identifier;

determining, using the first input data, a first action to be performed, by a skill component, in response to the first user input;

determining that performance of the first action is likely to result in an undesired response to the first user input;

sending, to the skill component, the first input data and a first indication representing that performance of the first action is likely to result in the undesired response;

receiving, from the skill component, first response data corresponding to the first user input, wherein the first response data is based on performance of a second action; and storing first dialog context data including the first response data and a second indication of the second action, the first dialog context data associated with the dialog session identifier and to be used for subsequent user inputs associated with the dialog session identifier.

6. The computer-implemented method of claim 5, further comprising:

receiving, from the skill component, the second indication of the second action;

receiving, from the skill component, first data used to perform the second action;

storing the first dialog context data to further include the first data;

receiving second input data corresponding to a second user input received subsequent to the first user input and associated with the dialog session identifier; and determining, using the second input data and the first dialog context data, a third action to be performed in response to the second user input.

7. The computer-implemented method of claim 5, further comprising:

determining, using the first input data, first entity data corresponding to the first user input;

sending, to the skill component, the first entity data; and receiving, from the skill component, second entity data used by the skill component to perform the second action.

8. The computer-implemented method of claim 5, further comprising:

determining entity data corresponding to the first input data;

processing the first input data and the entity data using a dialog model to determine the first action and a likelihood of the first action corresponding to the first input data and the entity data; and determining that the first action is likely to result in the undesired response based on the likelihood.

9. The computer-implemented method of claim 5, further comprising:

receiving second input data corresponding to a second user input;

determining, using the second input data, entity data corresponding to the second user input;

processing, by an inference engine, the second input data and the entity data using at least a first dialog model associated with the skill component;

determining, based on the processing using the at least the first dialog model, that the skill component is unable to perform an action responsive to the second user input;

sending, to the skill component and based on determining that the skill component is unable to perform the action responsive to the second user input, the entity data and a second indication that processing with respect to the entity data is out-of-domain for the skill component; and receiving, from the skill component, second response data corresponding to the second user input.

10. The computer-implemented method of claim 9, further comprising:

receiving, from the skill component, a third indication of an application program interface (API) invoked by the skill component to determine the second response data;

receiving, from the skill component, first data used by the API to determine the second response data;

storing second dialog context data including the second response data, the third indication and the first data; and determining an updated inference engine using the second dialog context data, the second input data and the entity data.

11. The computer-implemented method of claim 9, wherein the second response data indicates an error in processing with respect to the second input data and the entity data, and the method further comprises:

receiving, from the skill component, the second response data representing a natural language output indicating that a response to the second user input cannot be determined;

determining a natural language output representing that a response to the second user input cannot be determined;

determining, using the natural language output and text-to-speech (TTS) processing, output audio data representing synthesized speech; and sending, to a device, the output audio data in response to the second user input.

12. The computer-implemented method of claim 5, further comprising:

determining, using the first input data, entity data corresponding to the first user input;

based on determining that performance of the first action is likely to result in an undesired response to the first user input, determining, by an inference engine, an out-of-domain natural language response to be sent to a natural language generation component;

based on the out-of-domain natural language response, determining, by a controller component, an out-of-domain API; and sending, to the skill component, the entity data and a command to execute the out-of-domain API.

13. A system comprising:

at least one processor; and at least one memory including instructions that, when executed by the at least one processor, cause the system to:

receive first input data corresponding to a first user input associated with a dialog session identifier;

determine, using the first input data, a first action to be performed, by a skill component, in response to the first user input;

determine that performance of the first action is likely to result in an undesired response to the first user input;

send, to the skill component, the first input data and a first indication representing that performance of the first action is likely to result in the undesired response;

receive, from the skill component, first response data corresponding to the first user input, wherein the first response data is based on performance of a second action; and store first dialog context data including the first response data and a second indication of the second action, the first dialog context data associated with the dialog session identifier and to be used for subsequent user inputs associated with the dialog session identifier.

14. The system of claim 13, wherein the at least one memory includes further instructions that, when executed by the at least one processor, further cause the system to:

receive, from the skill component, the second indication of the second action;

receive, from the skill component, first data used to perform the second action;

store the first dialog context data to further include the first data;

receive second input data corresponding to a second user input received subsequent to the first user input and associated with the dialog session identifier; and determine, using the second input data and the first dialog context data, a third action to be performed in response to the second user input.

15. The system of claim 13, wherein the at least one memory includes further instructions that, when executed by the at least one processor, further cause the system to:

determine, using the first input data, first entity data corresponding to the first user input;

send, to the skill component, the first entity data; and receive, from the skill component, second entity data used by the skill component to perform the second action.

16. The system of claim 13, wherein the at least one memory includes further instructions that, when executed by the at least one processor, further cause the system to:

determine entity data corresponding to the first input data;

process the first input data and the entity data using a dialog model to determine the first action and a likelihood of the first action corresponding to the first input data and the entity data; and determine that the first action is likely to result in the undesired response based on the likelihood.

17. The system of claim 13, wherein the at least one memory includes further instructions that, when executed by the at least one processor, further cause the system to:

receive second input data corresponding to a second user input;

determine, using the second input data, entity data corresponding to the second user input;

process, by an inference engine, the second input data and the entity data using at least a first dialog model associated with the skill component;

determine, based on the processing using the at least the first dialog model, that the skill component is unable to perform an action responsive to the second user input;

send, to the skill component and based on determining that the skill component is unable to perform the action responsive to the second user input, the entity data and a second indication that processing with respect to the entity data is out-of-domain for the skill component; and receive, from the skill component, second response data corresponding to the second user input.

18. The system of claim 17, wherein the at least one memory includes further instructions that, when executed by the at least one processor, further cause the system to:

receive, from the skill component, a third indication of an application program interface (API) invoked by the skill component to determine the second response data;

receive, from the skill component, first data used by the API to determine the second response data;

store second dialog context data including the second response data, the third indication and the first data; and determine an updated inference engine using the second dialog context data, the second input data and the entity data.

19. The system of claim 17, wherein the second response data indicates an error in processing with respect to the second input data and the entity data, and the at least one memory includes further instructions that, when executed by the at least one processor, further cause the system to:

receive, from the skill component, the second response data representing a natural language output indicating that a response to the second user input cannot be determined;

determine a natural language output representing that a response to the second user input cannot be determined;

determine, using the natural language output and text-to-speech (TTS) processing, output audio data representing synthesized speech; and send, to a device, the output audio data in response to the second user input.

20. The system of claim 13, wherein the at least one memory includes further instructions that, when executed by the at least one processor, further cause the system to:

determine, using the first input data, entity data corresponding to the first user input;

based on determining that performance of the first action is likely to result in an undesired response to the first user input, determine, by an inference engine, an out-of-domain natural language response to be sent to a natural language generation component;

based on the out-of-domain natural language response, determine, by a controller component, an out-of-domain API; and send, to the skill component, the entity data and a command to execute the out-of-domain API.

\* \* \* \* \*